Aug. 23, 1960

A. J. MALAVAZOS

CALCULATING MACHINE DIFFERENTIAL DRIVE AND TENS CARRY MECHANISM 2,950,051

Filed Oct. 17, 1955

13 Sheets-Sheet 1

Aug. 23, 1960 A. J. MALAVAZOS 2,950,051

CALCULATING MACHINE DIFFERENTIAL DRIVE AND TENS CARRY MECHANISM

Filed Oct. 17, 1955 13 Sheets-Sheet 6

Aug. 23, 1960

A. J. MALAVAZOS

CALCULATING MACHINE DIFFERENTIAL DRIVE AND TENS CARRY MECHANISM 2,950,051

Filed Oct. 17, 1955

13 Sheets-Sheet 7

Aug. 23, 1960 A. J. MALAVAZOS 2,950,051

CALCULATING MACHINE DIFFERENTIAL DRIVE AND TENS CARRY MECHANISM

Filed Oct. 17, 1955 13 Sheets-Sheet 8

Aug. 23, 1960

A. J. MALAVAZOS

CALCULATING MACHINE DIFFERENTIAL DRIVE AND TENS CARRY MECHANISM 2,950,051

Filed Oct. 17, 1955

13 Sheets-Sheet 9

Aug. 23, 1960

A. J. MALAVAZOS 2,950,051

CALCULATING MACHINE DIFFERENTIAL DRIVE AND TENS CARRY MECHANISM

Filed Oct. 17, 1955

13 Sheets-Sheet 10

Aug. 23, 1960

A. J. MALAVAZOS

CALCULATING MACHINE DIFFERENTIAL DRIVE AND TENS CARRY MECHANISM 2,950,051

Filed Oct. 17, 1955

13 Sheets-Sheet 11

United States Patent Office 2,950,051

Patented Aug. 23, 1960

2,950,051

CALCULATING MACHINE DIFFERENTIAL DRIVE AND TENS CARRY MECHANISM

Arthur J. Malavazos, Oakland, Calif., assignor to Friden, Inc., a corporation of California Filed Oct. 17, 1955, Ser. No. 540,670

17 Claims. (Cl. 235—63)

This invention relates to calculating machines and more particularly to a calculating machine of the well-known Friden type, and more especially to an improved self-contained tens-transfer means particularly adapted for use in each of a plurality of storage registers simultaneously operated by a single actuating means, as, for example, in the interregister transfer machine of my patent, No. 2,909,320, issued October 20, 1959, or the duplex register calculator shown in the patent of Hawthorne, No. 2,908,441, issued October 13, 1959.

It is among the objects of the invention to provide a calculating machine having one or more registers with improved means for transferring tens from order to order in the single, or main, register and in each auxiliary register, if auxiliary registers are provided; to provide a tens-transfer mechanism operated by imparting an additional rotational step to the register drive members after the digitation portion of a machine operating cycle has been completed and which will make entirely independent tens-transfers in each of two or more registers from the same register drive shaft movements; to provide an improved tens-carry mechanism, the ordinal units of which operate independently to carry a transfer wave sequentially from lower to higher orders of the same register; to provide a tens-transfer mechanism in which each register dial is drivingly connected to the digitation mechanism only during that part of the digitation portion of each machine operating cycle during which the dial of the particular order may be driven so that the dials will not be moved by the tens-transfer impulses of the dial driving members unless a tens-transfer to a dial has been preset; to provide a tens-carry mechanism in which the tens-carry wave closely follows the value entering wave from the lowest to the highest activated order of the register; and to provide an improved tens-transfer mechanism having independently operating ordinal units and so constructed and arranged as to fit into multiple registers of the same size or smaller than the register of the Friden machine mentioned above.

It is also among the objects of the present invention to provide a calculating machine having one or more auxiliary registers in addition to the main register of the machine, with means for entering selected values into the auxiliary registers and clearing the auxiliary registers; to provide for the selective entry or non-entry of selected values into the auxiliary registers and for the selective additive or subtractive entry of selected values into selected auxiliary registers; to provide an auxiliary register assembly which may constitute an integral part of a multiple register or duplex calculating machine, or which may constitute a separate unit attachable to, and detachable from, an existing calculating machine; and to provide one or more auxiliary registers having improved tens-transfer means as mentioned above.

Other objects and advantages will become apparent from a consideration of the following description and the appended claims in conjunction with the accompanying drawings wherein:

Fig. 19 is a cross-sectional view, taken from the rear, of the right end of the duplex register of the embodiment shown herein, such as taken along the transverse plane indicated by the line 19—19 of Figs. 1 and 17;

Figure 1:
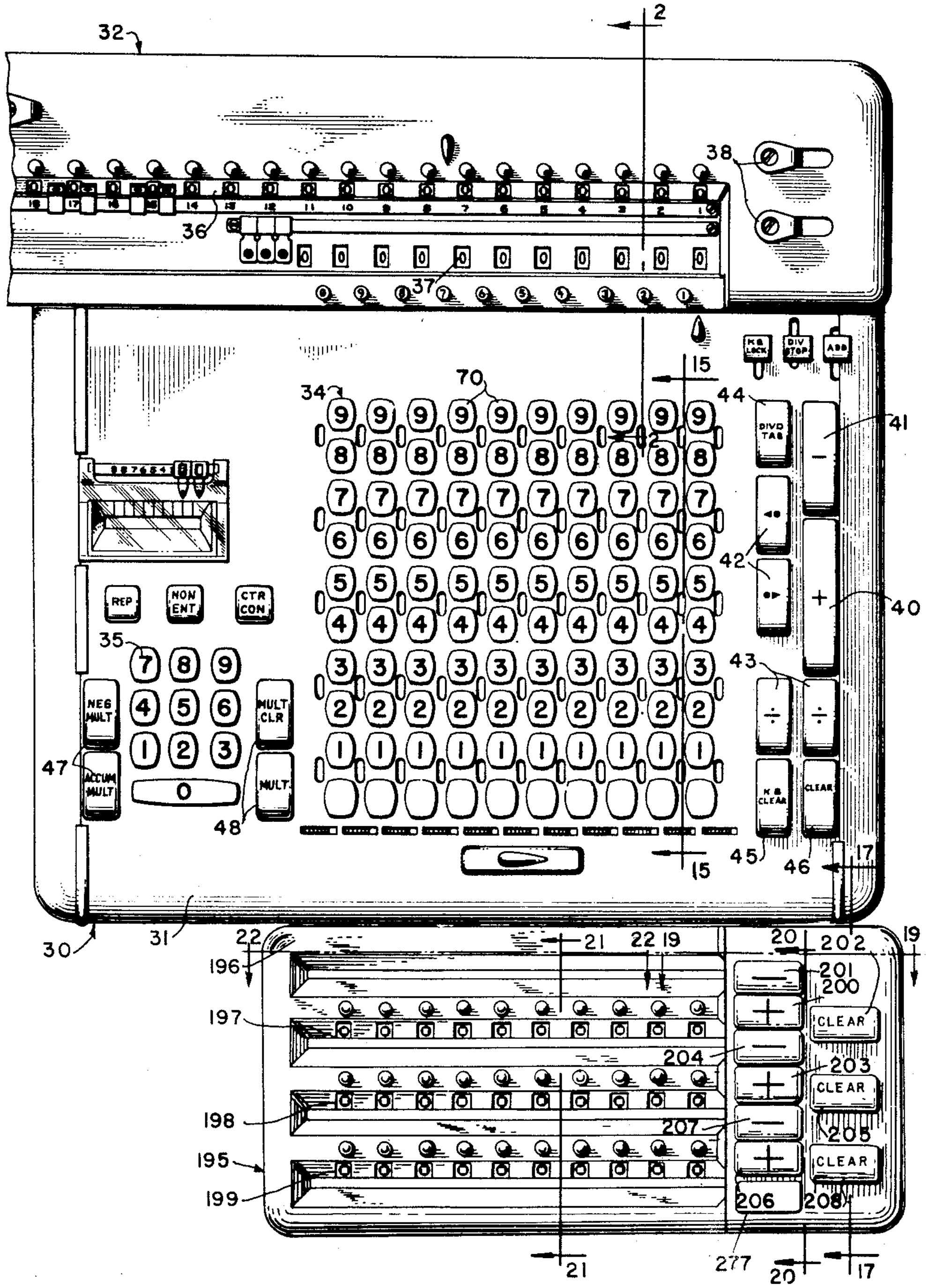
Fig. 1 is a top plan view of a calculating machine with an auxiliary register unit attached thereto.

With continued reference to the drawings, and particularly to Fig. 1, a calculating machine is illustrated having a fixed portion 30 enclosed in a cover 31, a shiftable carriage 32 mounted on the rear portion of the fixed portion 30 for endwise sliding movements, a multibank, or full, keyboard 34 mounted on the fixed portion of the machine with its keys extending through the cover 31, and a ten-key, or multiplying, keyboard 35, also mounted on the fixed, or stationary, portion of the machine with its keys extending through the machine cover. The carriage 32 carries the main accumulator register 36 and the counter register 37, together with the register clearing knobs 38; and the fixed, or stationary, portion of the machine carries the several control keys in addition to the keyboards 34 and 35. The control keys include the addition key 40, subtraction key 41, carriage shifting keys 42, division keys 43, dividend tabulator key 44, keyboard clear key 45, register clear key 46, and multiplication keys 47 and 48.

Figure 2:
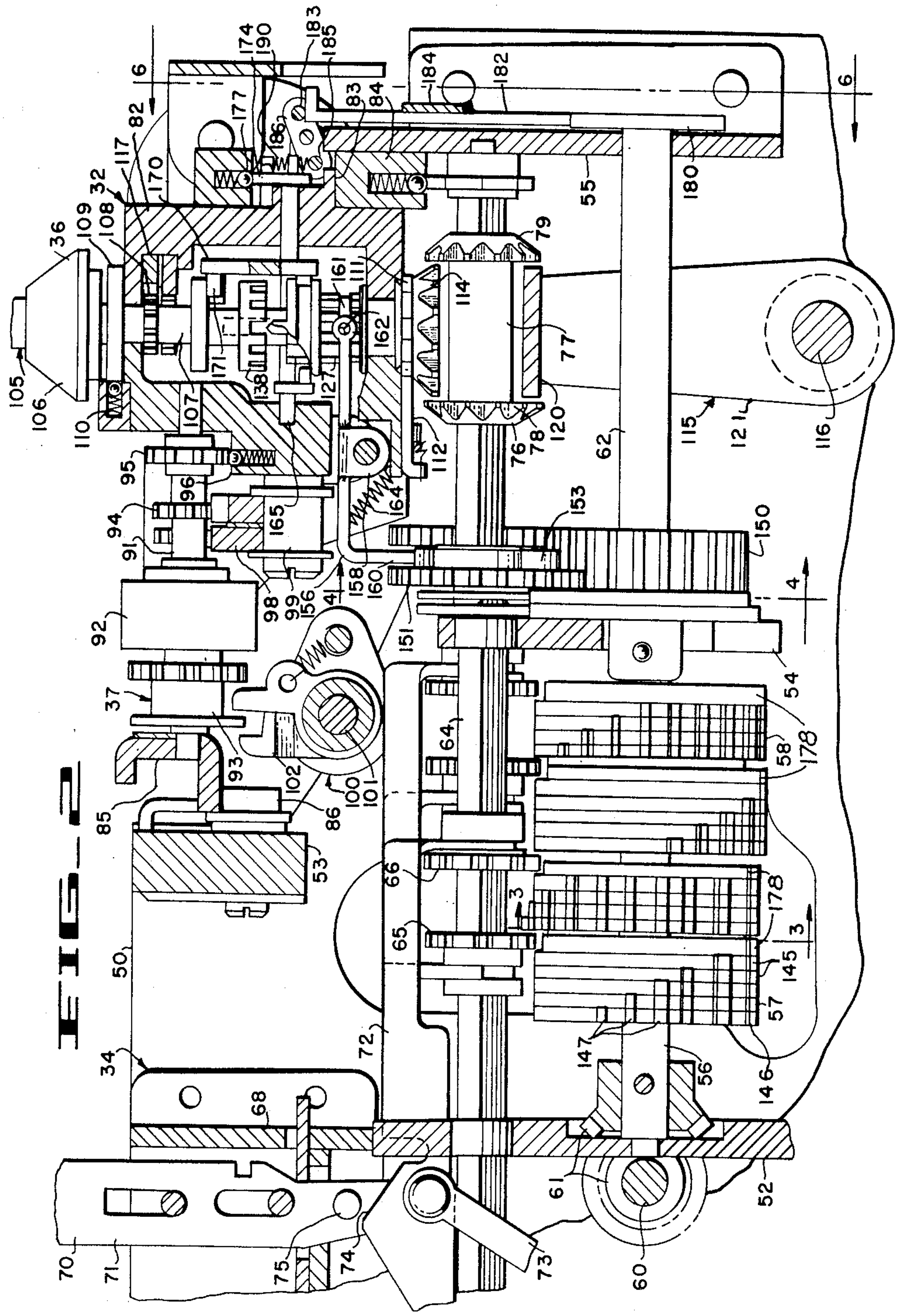
Fig. 2 is a longitudinal cross-sectional view of the actuator and register of the machine of Fig. 1, on an enlarged scale, taken substantially on the longitudinal plane indicated by the line 2—2 of Fig. 1, with the machine cover and other parts not essential to the present invention, omitted.
Figure 15:
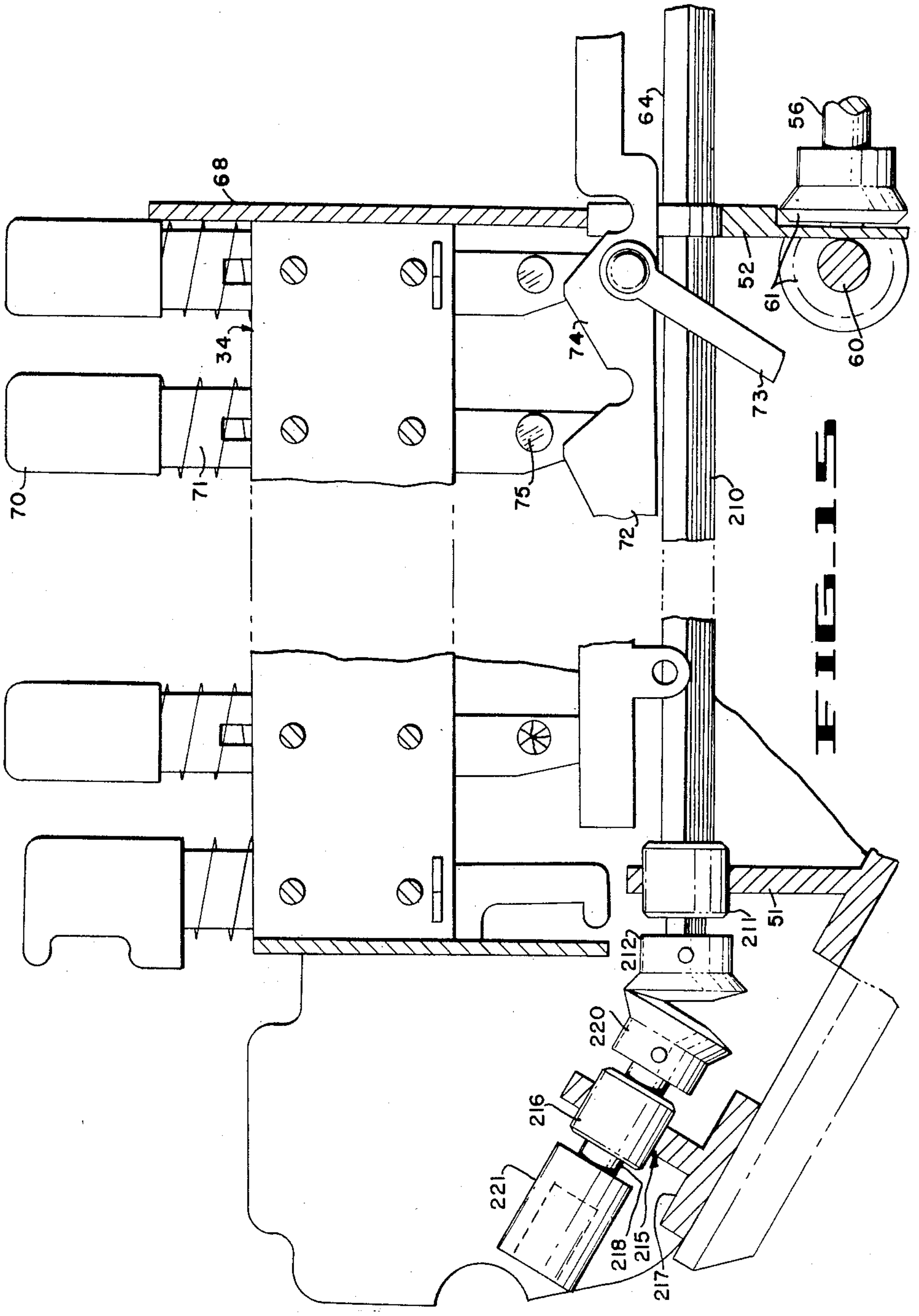
Fig. 15 is a fragmentary cross-sectional view on an enlarged scale of a portion of the interregister transfer mechanism, taken along the longitudinal vertical plane indicated by the line 15—15 of Fig. 1.

Referring now to Fig. 2, the machine has a frame of well-known construction including side plates, of which the left-hand plate is shown in Fig. 2 and indicated at 50, and transverse frame members, or bars, 51, 52, 53, 54, and 55, the member 51 being best shown in Fig. 15.

The digitation mechanism is of the well-known Thomas, or stepped drum, type used for many years in the Friden calculator and includes a series of actuator shafts 56 extending longitudinally of the machine in spaced and parallel relationship to each other. Each such actuator shaft carries a pair of stepped drum assemblies 57 and 58. Each drum assembly comprises a plurality of sector gears mounted in side-by-side relationship on the actuator shaft and having different numbers of gear teeth from "1" to "9," as is conventional in the art, and an additional tens-transfer tooth as will be explained hereafter. The actuator shafts are journalled at their front ends in the frame cross-member 52 and at their rear ends in the frame cross-member 54. At least three of the actuator shafts are extended rearwardly through the rear cross-member 55, as indicated at 62, to drive the carriage shifting mechanism and the automatic carriage clearing mechanism, as is fully disclosed in Patent No. 2,330,512, issued September 28, 1943, to John L. Moody for "Calculating Machine," and Patent No. 2,380,642, issued July 31, 1945, to Carl M. Friden and Anthony B. Machado for "Centralizing Mechanism."

A main drive shaft 60 extends along, and is journalled on, the crossframe member 52 and is drivingly connected to the actuator shafts 56 by individual miter gear connections 61. The main drive shaft 60 is driven by an electric motor through suitable reduction gearing and a cyclically operating clutch controlled by the control, or function, keys of the machine, as shown in Patent No. 2,229,889, issued January 28, 1941, to Carl M. F. Friden for "Calculating Machine," and Patent No. 2,279,455, issued April 14, 1942, to Carl M. F. Friden for "Calculating Machine."

A series of square shafts 64 extend through, and are journalled in, the frame cross-members 52 and 54 and extend rearwardly to the rear cross-member 55 in which the rear ends of these square shafts are journalled. There is one square shaft for each order of the keyboard of the machine, but only one actuator shaft 56 for each two square shafts, as shown in Patent No. 2,273,857, issued February 24, 1942, to Carl M. F. Friden for "Calculating Machine." Each square shaft carries two selection gears 65 and 66 engageable with the associated actuator drum 57 or 58 to drive the square shaft from the associated actuator shaft 56.

The keyboard 34 has a frame 68 detachably mounted on the machine frame and each keyboard key 70 thereof has a flat stem 71 mounted for vertical movement in the keyboard frame. A pair of selection slides 72 extend along each ordinal row of selection keys of the full keyboard and these slides are mounted for longitudinal movement on pivoted struts, as indicated at 73. The slides have upwardly opening, inclined notches 74. The key stems carry at their lower ends perpendicularly projecting studs 75 which engage the inclined edges of the slide notches to differentially set the slides 72. The arrangement is such that the "1" to "5" keys of an ordinal key row move one slide and the "6" to "9" keys move the other slide of the corresponding pair of slides, as shown in Friden Patent No. 2,229,889, referred to above. At their rear ends the selection slides are respectively connected to the selection gears 65 and 66 to set these gears in alignment with actuator drum sector gears having numbers of gear teeth corresponding to the numbers of the depressed selection, or digit, keys. When a selection gear is set and the machine is cycled, the associated square shaft will be turned through a number of predetermined angular intervals corresponding to the number of the selection key by which the selection gear was set. An add-subtract gear, or spool, 76 is slidably mounted on the rearward portion of each square shaft 64 and constrained to rotate with the square shaft. Each add-subtract gear 76 comprises an intermediate sleeve portion 77 of cylindrical shape and beveled gears 78 and 79, disposed one at each end of the sleeve 77.

The shiftable carriage 32 has a frame 82 of hollow, rectangular cross-sectional shape slidably mounted on the machine frame for endwise, reciprocatory movements of the carriage. A ledge 83 running along the rear side of the frame 82 slides on a rail 84 secured to the forward side of the rear cross-frame member 55 near the upper edge of the crossframe member, and a rail 85 secured to the carriage frame in spaced and parallel relationship to the forward side thereof, rides on anti-friction rollers 86 carried by the transverse frame member 53 at the rear side of the latter.

The counter register 37 is carried by the carriage between the frame 82 and the front rail 85 and comprises a series of dial assemblies, each including a shaft 91 journalled at its rear end in the frame 82 and at its front end in the rail 85, a numbered dial 92 mounted on the shaft intermediate the length thereof, a drive gear and notched flange unit 93 mounted on the shaft between the dial 92 and the rail 85, a mutilated clearing gear 94 mounted on the shaft between the dial 92 and the carriage frame 82, and a centering wheel 95 mounted on shaft 91 adjacent the forward side of the carriage frame and engaged by a spring detent 96 mounted in the frame. A double clearing rack 98 extends over guides 99 projecting from the forward side of the carriage frame and engages the clearing gears 94 to clear the counter register whenever the rack is moved, either manually or automatically, relative to the carriage.

The counter register actuator 100 is mounted on the machine frame below the counter register 37 and includes a shaft 101 which is reciprocated longitudinally and rocked rotationally when the machine cycles, and spring-biased fingers 102 mounted on the shaft 101 and engageable with the drive gears of the unit 93 to turn the drive gears by successive orders, as is more fully illustrated and described in Patent No. 2,229,889, referred to above.

The product, or accumulator, register comprises a series of dial assemblies 105 extending through, and journalled in, the carriage frame 82 and providing numbered dials 106 at the top of the frame where they are readily visible through window openings provided in the carriage cover. As is shown in detailed in Figs. 8 to 14, inclusive, each dial assembly 105 comprises a shaft 107 extending through, and journalled in, the carriage frame and carrying, in addition to the dial 106 on its upper end, a mutilated clearing, or zeroizing, gear 108 within the upper portion of the interior of the frame, a centering wheel 109 at the top of the frame, cooperating with a spring detent 110, a centering wheel 111 at the bottom of the frame cooperating with a spring detent 112, and a beveled gear 114 on its bottom end immediately below the centering wheel 111. A double clearing rack 117 extends along a groove in the upper portion of the interior of frame 82 and engages the mutilated gears 108 to zeroize the dials 106 when the rack is moved, either manually or automatically, to the right relative to the carriage 32.

An add-subtract gate 115 is disposed below the add-subtract gears 76 and comprises a rockable shaft 116 journalled at its ends in the machine frame, and a bail mounted on the shaft and comprising a flat bar, or strap, 120 extending between the gears 78 and 79 below the sleeves 77 in spaced and parallel relationship to the shaft 116 and connected at its ends to the shaft by legs, as indicated at 121. Rocking of the gate 115 moves the add-subtract gears 76 between their addition, subtraction and neutral positions. The mechanism for rocking the gate for various machine functions, such as addition, subtraction, multiplication and division, is shown in Patent No. 2,229,889, referred to above, Patent No. 2,327,981, issued August 31, 1943, to Carl M. F. Friden for "Calculating Machine," and Patent No. 2,371,752, issued March 20, 1945, to Carl M. F. Friden for "Calculating Machine."

Whenever any one of the accumulator dial assemblies, except the highest order assembly, is turned through its "9" to "0" position, it is necessary to make a tens-carry, or transfer, by turning the dial assembly of the next higher order through one unit space in the appropriate direction. The present invention particularly relates to a new and improved mechanism for making tens-transfers in the product register.

Continuing with Figs. 8 to 14, inclusive, it will be noted that the dial shaft 107 is provided in two parts, 124 and 125, disposed in end-to-end relationship and connected at their adjoining ends by a tenon joint of sufficient length to maintain the two parts in alignment, but providing, at times, a freedom of relative rotational movement between the upper portion 124 and the lower portion 125 of the dial shaft. The lower shaft portion 125 has a non-cylindrical, or polygonal, shape, preferably square, except for the reduced lower end portion which receives the gear 114. A bearing sleeve 126 embraces the shaft portion 125 immediately above the reduced lower end portion of the shaft, which bearing sleeve is journalled in a bearing aperture in the bottom wall of the carriage frame 82. An externally splined sleeve 127 is slidably mounted on the lower shaft portion 125 immediately above the bearing sleeve 126 and constrained to rotate with the shaft. This sleeve is provided near its lower end with an external annular groove 128. A pair of diametrically opposed teeth, or lugs, 130 and 131 project upwardly from the upper end of the sleeve 127 and have double beveled upper ends.

An internally grooved ring 132 surrounds the sleeve 127 and has lands fitting slidably in the grooves between the splines, or lands, of the splined sleeve. This ring is provided with an external annular groove 133, and has a pair of diametrically opposed lugs, or teeth, 134 and 135 extending upwardly from its upper end radially outside of the lugs 130 and 131, and having doubled beveled upper ends. With this arrangement the splined sleeve 127 can slide vertically relative to the shaft 107 and ring 132 can slide vertically relative to the shaft and the sleeve 127 but is constrained to rotate with the shaft and the sleeve.

A clutch element, or disk, 138 of cylindrical shape, is provided on the lower end of the upper dial shaft portion 124 and is provided in its bottom surface with uniformly spaced, radial slots, or grooves, 139 in which the lugs 130, 131, 134, and 135 are, at times, engageable, as will be later explained. Normally there are ten slots 139 separated by equiangular intervals of 36°. The clutch element 138 and splined sleeve 127 together constitute a primary, or dial driving, clutch and the clutch element and ring 132 together constitute a secondary, or tens-transfer clutch.

At a location spaced above the clutch element 138, the upper dial shaft portion 124 is provided with a cam disk 142 having a radially disposed cam lobe 143 depending from its bottom surface, this cam lobe being angularly located with respect to the "0" location of the dial 106. A twirler knob 144 is provided on the upper end of the shaft 107 above the dial 106 so that the dials can be manually set when desired.

Figures 3, 4, 5:
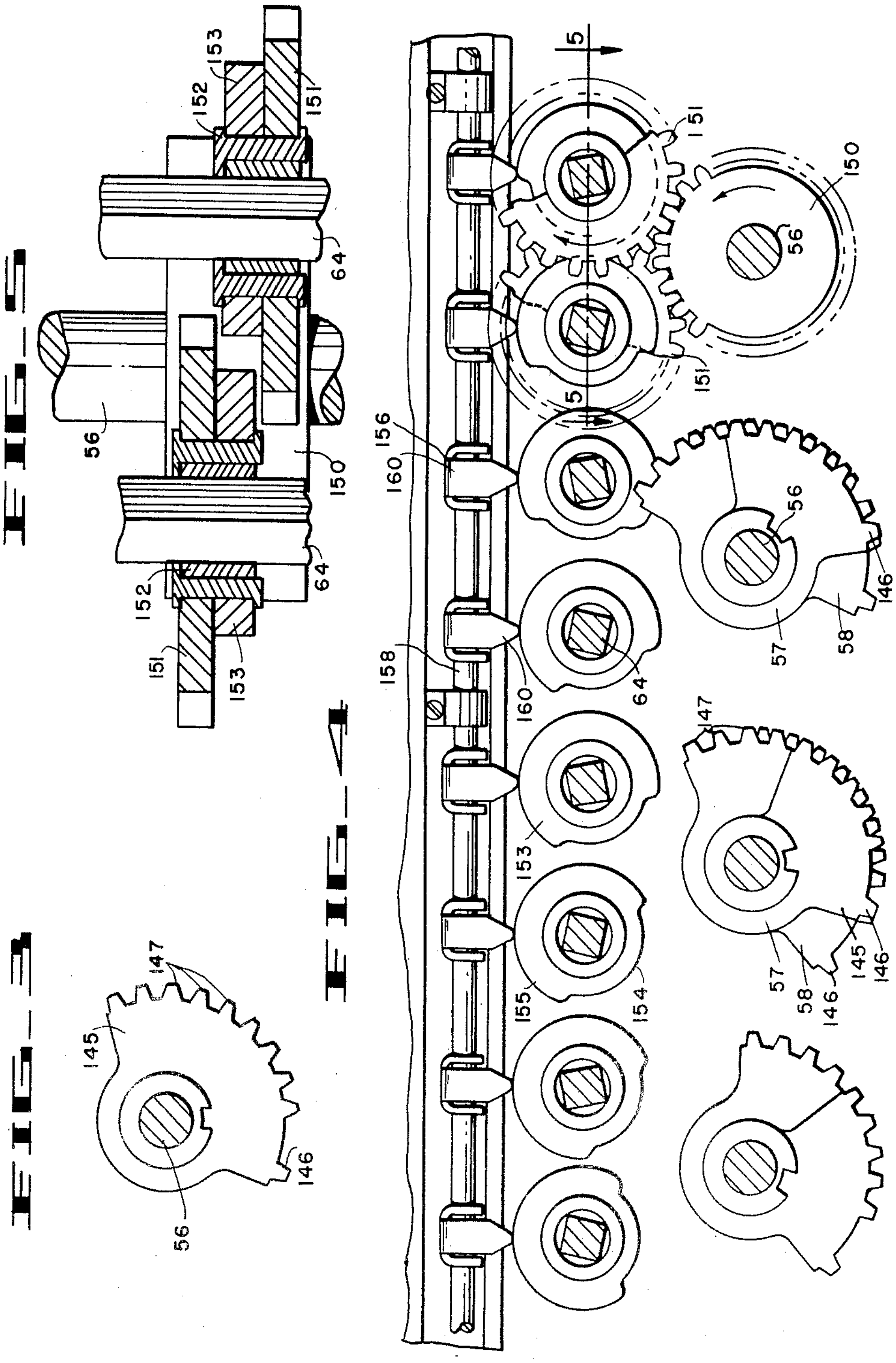
Fig. 3 is a cross-sectional view of an actuator drum, such as taken along the transverse plane indicated by the line 3—3 of Fig. 2.
Fig. 4 is a fragmentary cross-sectional view of the tens-transfer control gear, such as taken along the transverse plane indicated by the line 4—4 of Fig. 2.
Fig. 5 is a fragmentary cross-sectional view on an enlarged scale taken along the plane indicated by the line 5—5 of Fig. 4.

It will be noted from Fig. 4 that the actuator drums 57 and 58 on the several actuator shafts 56 are angularly, or rotationally, stepped from right to left (counter-clockwise), both with respect to the two drums 57, 58 on each shaft 56 and with respect to the successive shafts—the shafts themselves rotating in a counter-clockwise direction in this figure. That is, the drum 57 on the right-hand actuator shaft will engage the first order selection gears 65, 66 before the drum 58 on that shaft will engage its selection gears, as is shown particularly in the middle drums of this figure. Also the actuator 58 on the right-hand one of any pair of shafts will be operative upon its selection gears 65, 66 before the adjacent higher order actuator 57 will engage its respective gears 65, 66. This method of operation continues progressively from right to left so that only one or two selection gears can be engaged by the actuator drums at the same time. This is done to relieve the power mechanism of the machine from heavy, or shock, loads; but requires that a greater angular extent of the first portion of a machine cycle be used for the value entry, or digitation, operation than would be necessary if all of the actuator drums engaged the selection gears at substantially the same time. The actuator drums on the left-hand actuator shaft do, however, move all of their gear teeth past, and out of mesh with, the corresponding selection gears a sufficient angular interval before the end of the cycle for a tens-transfer wave to be completed between the end of the digitation operation and the end of the coincident operating cycle of the machine.

It will also be noted from an inspection of Figs. 2 and 4, that each of the actuator drums comprises a series of thin gear sectors 145 of progressively differing number of teeth assembled to form an integral drum. It will also be noted that each of the gear sectors is provided with an extra tens-transfer tooth 146 spaced from the trailing end of the series of digitation teeth 147 of the particular sector, so that each actuator drum has an aligned set of tens-transfer teeth following the value entering teeth thereof, and has a tooth 178 in the space occupied by the corresponding selection gear 65 or 66 when no selection has been made in that order of the keyboard. The tens-transfer teeth 146 of each drum are aligned longitudinally of the corresponding actuator shaft and the result of this arrangement is that each square shaft 64 is rotated an additional increment after the digitation, or value entering, interval for that square shaft has terminated, regardless of whether or not a selection key in the co-ordinal key row has been actuated. Since the extra turn of the square shafts is chronologically progressive from the lowest to the highest order, this means that tens-transfers can be started in the lower orders of the digitation mechanism before digitation, or value entry, is completed in the higher orders; and the tens-transfer wave can closely follow the digitation, or value entering, wave. This structure provides ample time in an operating cycle for both waves, with time available before the end of the cycle or other functions, such as transfer of the value in the product register to a storage, or grand total, register.

Since all of the square shafts are given an extra unit turn after the digitation intervals for the individual square shafts have terminated, it is necessary to interrupt the drives between the square shafts and the product register dials in those orders where no tens-transfers have been set up, before the extra, or tens-transfer, incremental rotation of the square shafts take place, so that these extra incremental movements of the square shafts will not be recorded by the dials to give erroneous results. Also, since the tens-transfer movements of the low order square shafts occur before the value entering movements of the high order square shafts have terminated, the gate 115 cannot be used to interrupt the drives between the square shafts and the register dials, but these drives must be individually and sequentially interrupted, progressively from the lowest to the highest order of the square shafts.

To this end a gear 150 is mounted on each actuator shaft 56 immediately to the rear of the frame cross-member 54, and a driving connection is provided between the shaft and the gear. A gear 151 is journalled on each square shaft 64 by an individual bearing bushing 152 (Fig. 5), the gears 151 on the square shafts at opposite sides of a particular actuator shaft both meshing with the gear 150 on that actuator shaft, the gear 150 having sufficient width that the two associated gears 151 can overlap and still mesh with it. A plate cam 153 is rotatably mounted on each bearing bushing 152 against, and secured to, the corresponding gear 151. Each cam 153 has a low portion 154 of substantially the same angular extent as the series of value entering teeth 147 on a nine-toothed actuator drum sector 145, or as the angular extent of the value entering interval of the corresponding actuator shaft, and a lobe portion 155 corresponding in angular extent to the complementary circular angle, that arising when the angle of the tooth series of a nine-tooth actuator drum sector is subtracted from the complete cycle of 360°, or to the tens-transfer interval of the corresponding actuator shaft. The cams are angularly advanced progressively from right to left, or from the lowest to the highest order, so that they are in phase angularly with the corresponding actuator drums, and the leading end of the lobe of a low order cam will have reached a predetermined angular point before the leading edge of the lobe of a higher order cam will have reached a corresponding point in the circular, or angular, diagram of the operating cycle.

A series of geniculate levers 156 is disposed along the lower front edge of the carriage frame 82, as shown in Fig. 2, each extending rearwardly from the coordinal cam 153 through an aperture in the front of the carriage frame bar 82 to the coordinal splined sleeve 127. Each of these levers is supported intermediate its length on the carriage frame 82 by an individual pivotal mounting 158, the axis of which extends longitudinally of the frame. Each lever is provided at its front end with a downwardly extending, cam sensing, finger 160 and at its rearward end with a yoke formation 161 which extends partly around the corresponding sleeve 127 and carries pins, or studs, 162 which extend into the annular groove 128 (Figs. 8 and 9) in the sleeve 127. A tension spring 164 connected between each lever 156 and the carriage frame 82 resiliently urges the rear end of the lever upwardly and lifts the corresponding sleeve 127 to seat the lugs 130 and 131 in aligned slots 139 in the clutch element 138. When the sleeve 127 is thus raised it drivingly connects the lower portion 125 of the coordinal dial shaft 107, carrying the gear 114, to the upper portion 124, carrying the dial 106, so that, if the coordinal square shaft 64 is now turned with the gear 114 in mesh with one of the gears 78 or 79, the dial will be correspondingly turned.

When a keyboard selection has been made and an operating cycle of the machine initiated by depression of the selected control key, the fingers 160 of the levers 156 of at least the first two orders will be in the leading ends of the low portions of the corresponding cams 153. The sleeves 127 and clutch elements 138 of the corresponding orders of the product register will drivingly connect the gears 114 to the dials 106 of these same orders. Digitation in the first two orders will thus start substantially as soon as the cycle begins and will proceed progressively through any remaining orders covered by the selection as the teeth of the actuator drums in these orders reach the corresponding selection gears and the cams 153 are turned to release the corresponding levers 156.

As soon as the digitation, or value entry, interval in any order is completed, and before the extra teeth on the associated actuator drum impart an additional unit space movement to the corresponding square shaft, the finger 160 of the coordinal level 156 rides up on the leading end of the lobe of the corresponding cam 153. This forces the coordinal sleeve 127 downwardly to remove the sleeve lugs 130 and 131 from the radial slots in the clutch element 138 and thereby disconnects the gear 114 from the corresponding dial 106. Thus, when the tens-transfer teeth 146 on the actuator drum impart a rotational tens-transfer movement to the square shaft 64, the dial will not be moved unless a tens-carry has been set up in that order.

Figures 6, 7:
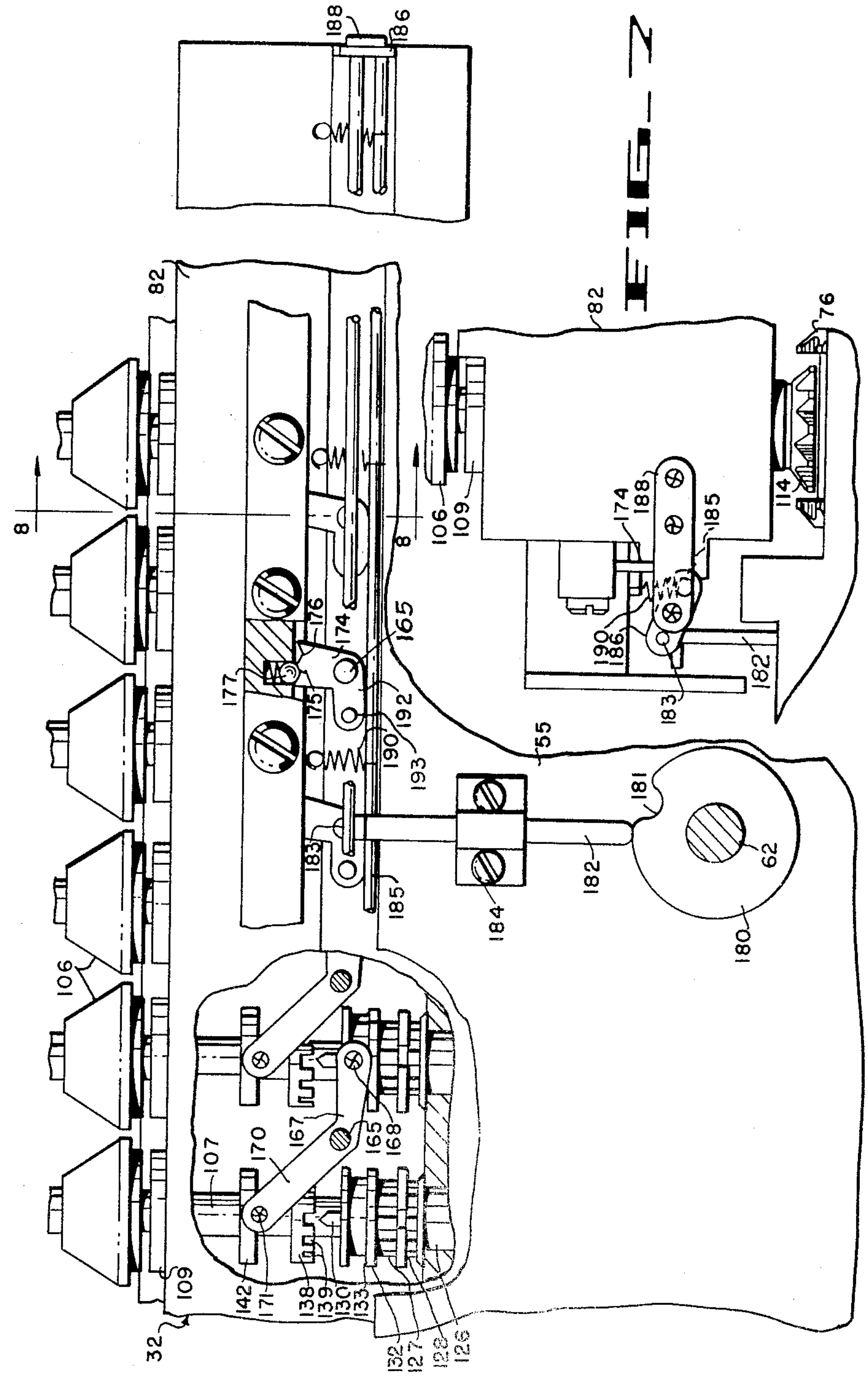
Fig. 6 is a fragmentary rear elevational view looking from the transverse vertical plane indicated by line 6—6 of Fig. 2.
Fig. 7 is a fragmentary end elevational view of the right-hand end of Fig. 6.
Figures 8, 14:
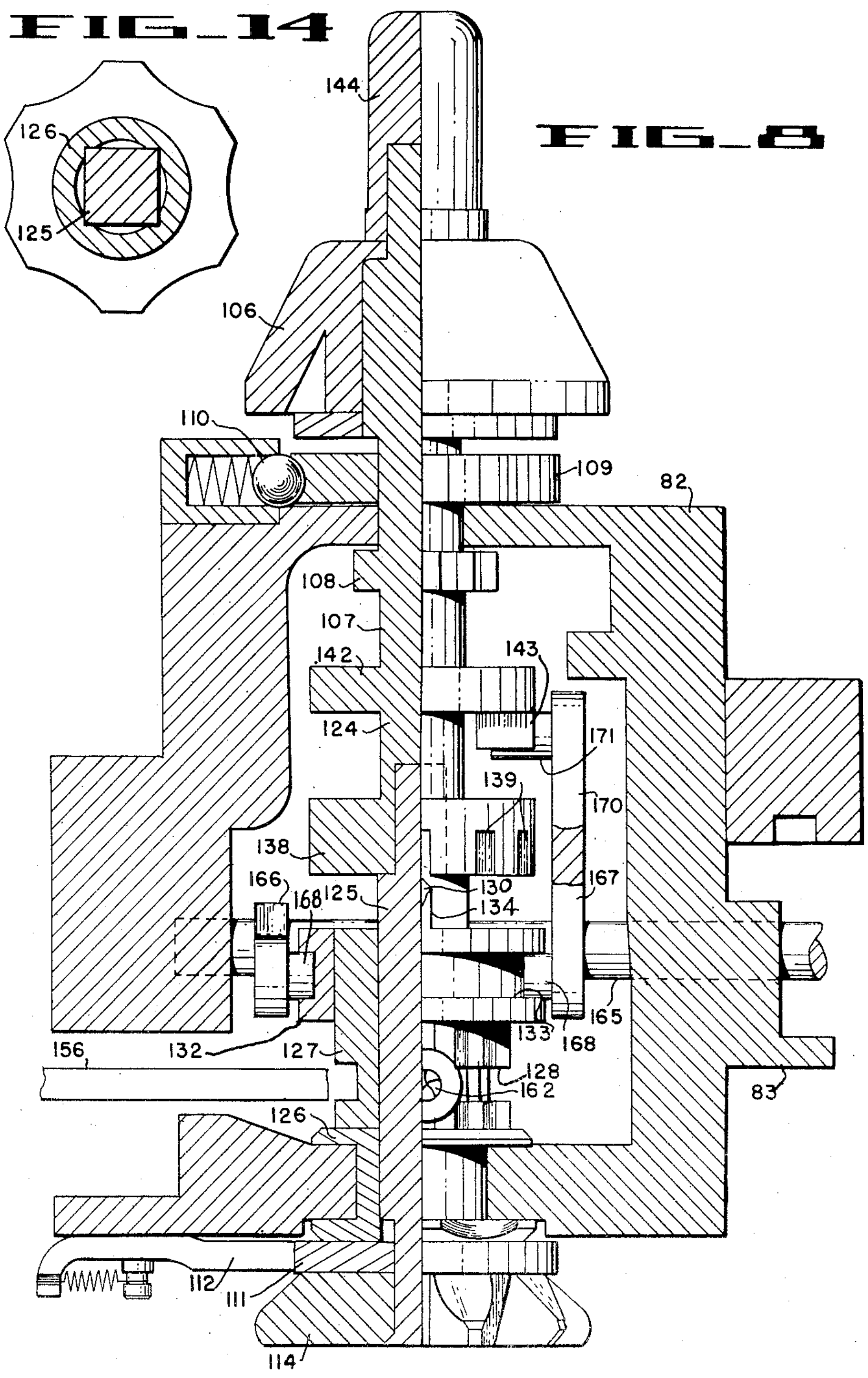
Fig. 8 is a fragmentary cross-sectional view on an enlarged scale of a dial assembly and mounting therefor, including the tens-transfer mechanism of the present invention, taken along the longitudinal vertical plane indicated by the line 8—8 of Fig. 6.
Fig. 14 is a transverse cross-sectional view taken along the plane indicated by the line 14—14 of Fig. 9.
Figure 9:
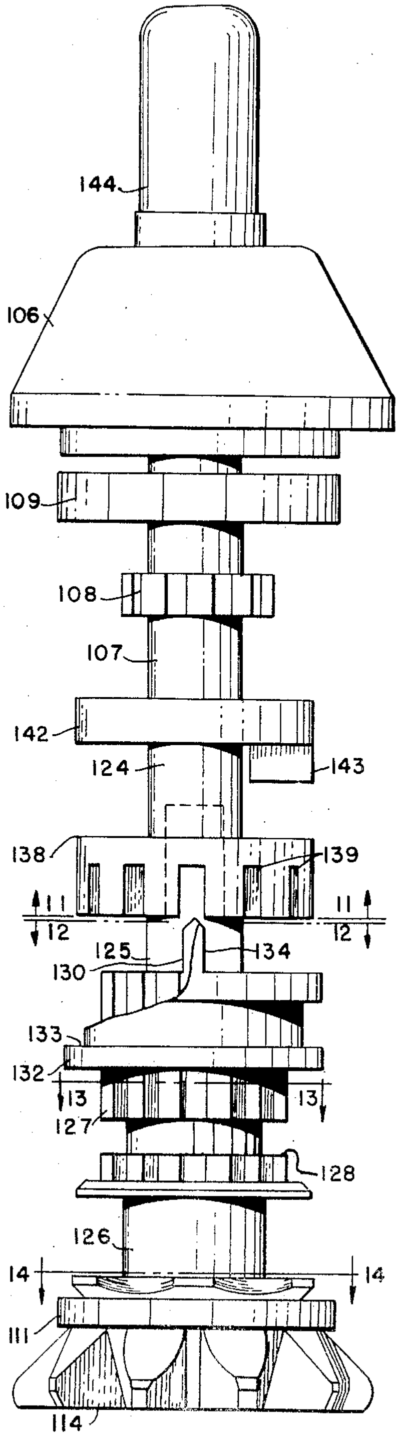
Fig. 9 is another elevational view of a register dial and tens-transfer unit assembly.
Figure 10:
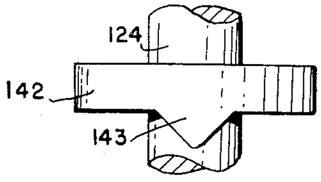
Fig. 10 is an elevational view of a fragmentary portion of the assembly shown in Fig. 9, with the position of the portion in Fig. 10 turned 90° from the position of the same portion in Fig 9.
Figure 11:
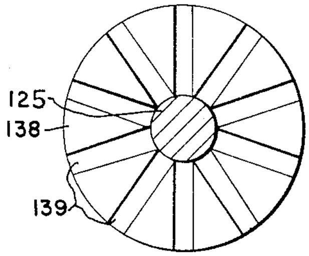
Fig. 11 is a transverse cross-sectional view taken along the plane indicated by the line 11—11 of Fig. 9.
Figure 12:
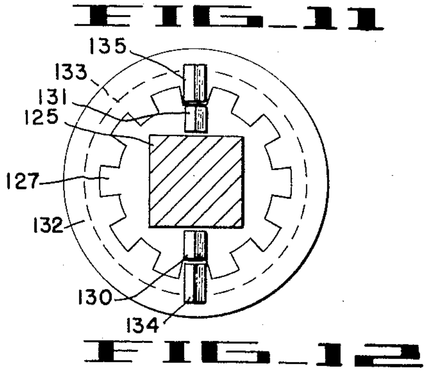
Fig. 12 is a transverse cross-sectional view taken along the plane indicated by the line 12—12 of Fig. 9.
Figure 13:
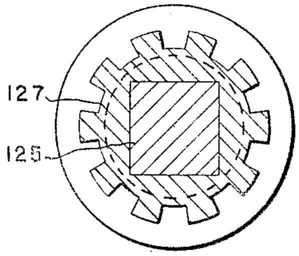
Fig. 13 is a transverse cross-sectional view taken along the plane indicated by the line 13—13 of Fig. 9.

A series of shafts 165 extends transversely through, and is journalled in, the carriage frame 82 with their axes substantially at right angles to the axes of the dial shafts 107, each shaft 165 preferably being disposed just to the right of a corresponding grooved ring 132 (to the left when viewed from the rear, as in Fig. 6). Arms 166 and 167 (Fig. 8) extend perpendicularly from each shaft 165 at respectively opposite sides of the adjacent ring 132. These arms carry pins, or studs, 168 projecting into the groove 133 of the ring 132 to the left of the associated shaft 165 (to the right in Fig. 6) to raise and lower the ring when the shaft is rocked. Each arm 167 has an extension 170 (Fig. 6) inclined upwardly and to the right (to the left in Fig. 6) from the shaft 165 and carrying at its distal end an abutment, or stud, 171 underlying the cam disk 142 of the dial assembly immediately to the right (left in Fig. 6) of the dial assembly including the ring 132 engaged by the stud 168, that is, the dial assembly of the next lower order.

With this arrangement, when a dial 106, except the dial of the highest order, is turned through its tens-transfer, or "9" to "0" position, the cam lobe 143 of this dial assembly engages the corresponding abutment 171 and rocks the associated lever 170 and shaft 165, raising the ring 132 of the next higher order dial assembly to engage the ring lugs 134 and 135 in aligned grooves 139 of the coordinal clutch element 138. This maintains the gear 114 connected to the dial 106 as long as the ring 132 is raised, even though the sleeve 127 should be lowered to interrupt the connection which it provides when raised.

After a ring 132 has been raised by the associated cam 142 to set up a tens-transfer, it is necessary that the ring be maintained in raised position until after the value entry interval in the particular order has been completed and the tens-transfer teeth on the associated actuator drum have imparted the additional rotational step to the coordinal square shaft to complete the tens-transfer. After the tens-transfer has been completed it is necessary to lower the ring 132 to bring its lugs out of engagement with the clutch element 138 and thereby return control of the driving connection from the coordinal gear 114 to the dial 106 to the coordinal sleeve 127.

As shown in Figs. 2 and 6, each shaft 165 extends through the rear wall of the carriage frame 82 and carries on its rearward end a perpendicularly disposed arm 174 having in its upper end spaced notches 175 and 176 alternatively receiving a spring detent 177 to releasably latch the associated ring 132 in either its raised or its lowered position. Once the ring 132 is raised by the cam 142 and lever 167, as described above, it will be maintained in raised position until the tens-transfer is completed and until the ring is forcibly returned to its lowered position.

A plate cam 180 is mounted on the rearward end of one of the actuator shaft extensions 62, being disposed at the rearward side of the rear transverse frame member 55. This cam has a circular, concentric lobe and a restricted recess 181 in the form of a peripheral notch which receives the bottom end of a slidable staff 182 at, or near the end of each operating cycle of the machine. At its upper end the staff rockingly engages one rod 183 of a bail extending along the rear side of the carriage frame 82. The staff 182 is slidably mounted for vertical movement in a bracket 184 mounted on the back plate 55. The bail has a second rod 185 held in spaced and parallel relationship to the rod 183 by end pieces, as indicated at 186, pivotally mounted intermediatae their length on brackets, as indicated at 188, secured to the carriage frame and extending rearwardly of the back plate 55.

A plurality of springs 190, connected between the bail rod 185 and a plurality of pins secured to the carriage frame, resiliently urge the rod 185 upwardly. The notched levers, or dogs, 174 each has a rightwardly directed tail portion 192 (left in Fig. 6), carrying at its distal end a stud, or pin, 193 resting above the bail rod 185. The bail 185 slides longitudinally relative to the staff 182 so that the staff is effective to rock the bail at any position of the carriage 32 relative to the machine frame.

During the major portion of an operating cycle of the machine, and up to within a few degrees of the end of the cycle, by which time the tens-transfers have all been completed, the circular lobe portion of the cam 180 holds the bail rod 183 up, and the bail rod 185 down, against the force of springs 190, rendering the dogs 174 free to move from their full-cycle, or inoperative, position to their tens-carry set-up position, as described above. Near the end of the cycle the bottom end of staff 182 drops into the notch, or recess, 81 of cam 180, due to the force of the tensioned springs 190 which rock the bail to lift the bail rod 185 and restore all of the dogs that have been moved to the tens-carry position back to their inoperative position, incidentally moving all of the rings 132 that have been raised to the tens-carry position down to their inoperative position in which the ring lugs, or dogs, 134 and 135 are clear of the corresponding clutch elements 138.

With a tens-transfer ring 132 raised and latched in raised position, as described above, when the extra tens-transfer tooth 146 of the coordinal actuator drum 57 or 58 engages the corresponding selection gear and imparts an additional step of rotational movement to the coordinal square shaft after the sleeves 126 have been lowered, the dial associated with the raised ring will be turned an additional unit space to complete the tens-transfer, but those dials associated with rings that have not been raised will not be turned.

A suggested use for the improved tens-transfer mechanism hereinabove described is shown in Figs. 1 and 15 to 22, inclusive, and relates to supplementary, or storage, registers that may be built into the machine or may be attached to, and operated by, the machine, as may be desired. In the arrangement illustrated, the supplementary registers are provided in a separate unit 195 disposed at the front of the machine with its control keys substantially in alignment with the control keys of the machine.

The unit 195 is enclosed in a housing, or casing, 196 and, for purposes of exemplification only, is shown as providing three registers 197, 198 and 199. Each supplementary register has at the right-hand end thereof, three control keys including an addition key 200, a subtraction key 201 and a clear key 202 as shown for the register 197, while the register 198 has corresponding keys 203, 204 and 205 and the register 199 has corresponding keys 206, 207 and 208.

Referring first to Fig. 15, it will be noted that the square shafts 64 are extended forwardly, as indicated at 210, through the front cross-member 51 of the machine frame, and carry bearing sleeves 211 journalled in apertures in the front cross-member 51 and bevel gears 212 on their front ends. A plurality of ordinally arranged square shaft couplings 215 are mounted in the front portion of the machine housing, each comprising a bearing sleeve 216 journalled in an inverted T bracket 217 extending across the front end of the calculating machine, shaft 218 extending through the bearing sleeve 216 in alignment with the corresponding square shaft extensions 210, a beveled gear 220 on the rear end of the shaft 218 meshing with the coordinal beveled gear 212, and a socket 221 on the front end of the shaft 218. The sockets 221 provide means whereby the square shafts (Fig. 21) of the supplementary register unit can be attached to, detached from, and driven by, the mechanism of the calculating machine.

Figure 21:
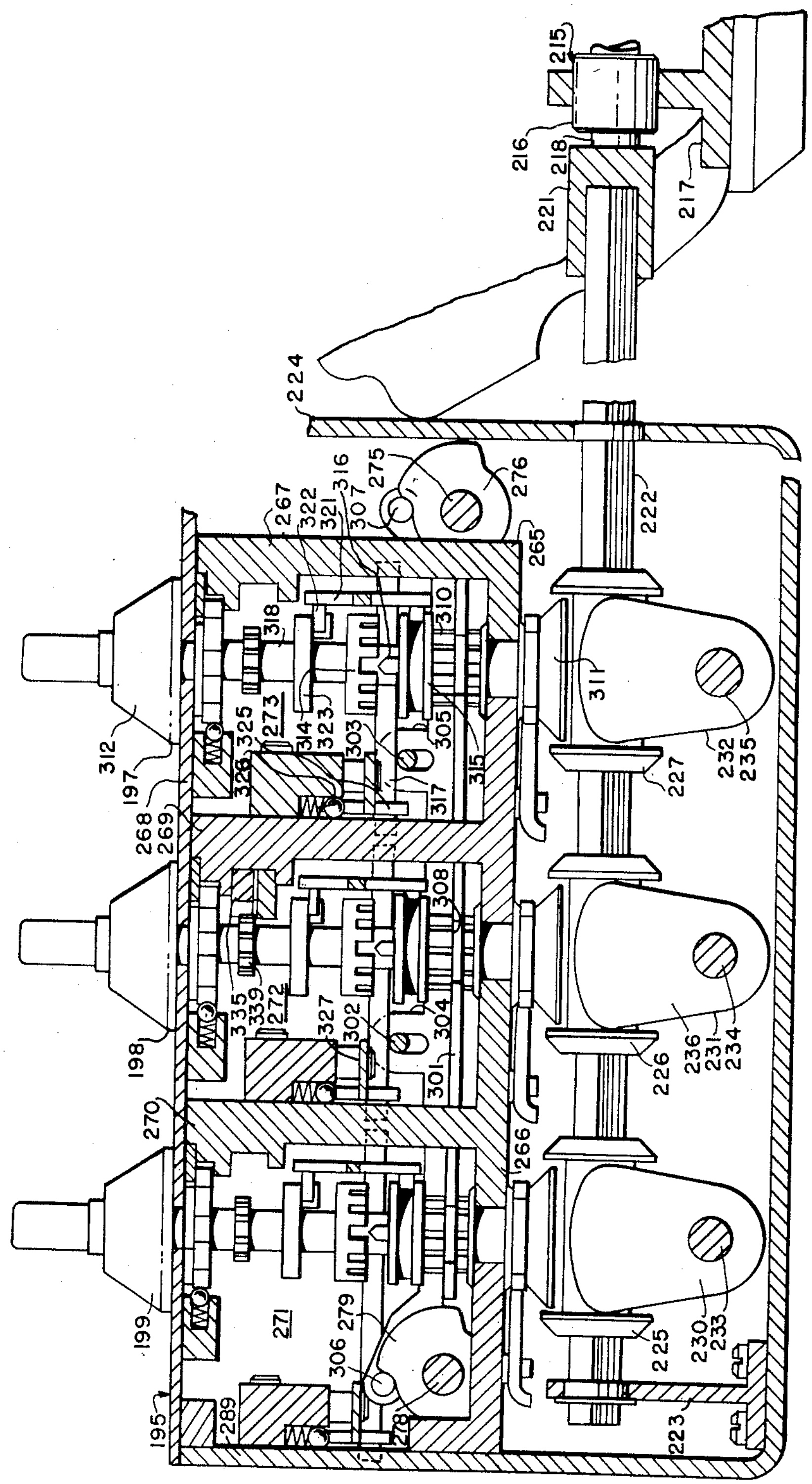
Fig. 21 is a cross-sectional view on an enlarged scale of the three storage registers illustrated in Fig. 1, such as taken along the longitudinal vertical plane indicated by the line 21—21 of Fig. 1; and, Fig. 22 is a cross-sectional view, taken from the rear, of one of the storage registers illustrated in Fig. 1, such as taken along the transverse plane indicated by the line 22—22 of Fig. 1.

Referring now to Fig. 21, the unit 195 has a series of spaced and mutually parallel square shafts 222 journalled near their rearward ends in the rear frame wall, or plate, 224 of the unit 195 and at their forward ends in a bearing bracket 223, and drivingly connected by the couplings 215 to the coordinal square shaft extensions 210 of the calculating machine. In the example of three supplementary registers illustrated, each square shaft 222 carries three add-subtract gears, or spools, 225, 226 and 227, similar in all respects to the add-subtract gears 76 described above. The gears 225, 226 and 227 are moved between their addition, subtraction and neutral positions by corresponding add-subtract gates 230, 231 and 232 extending longitudinally of the interior of the unit 195 below the corresponding supplementary registers 199, 198 and 197. Each add-subtract gate comprises a rockable shaft, as indicated at 233, 234 and 235, journalled in suitable bearings in, or on, the unit frame, and a series of arms 236 extending upwardly from each shaft in spaced and parallel relationship to each other with the upper end of each arm disposed between the terminal gears of a corresponding add-subtract gear 225, 226 or 227.

Figure 20:
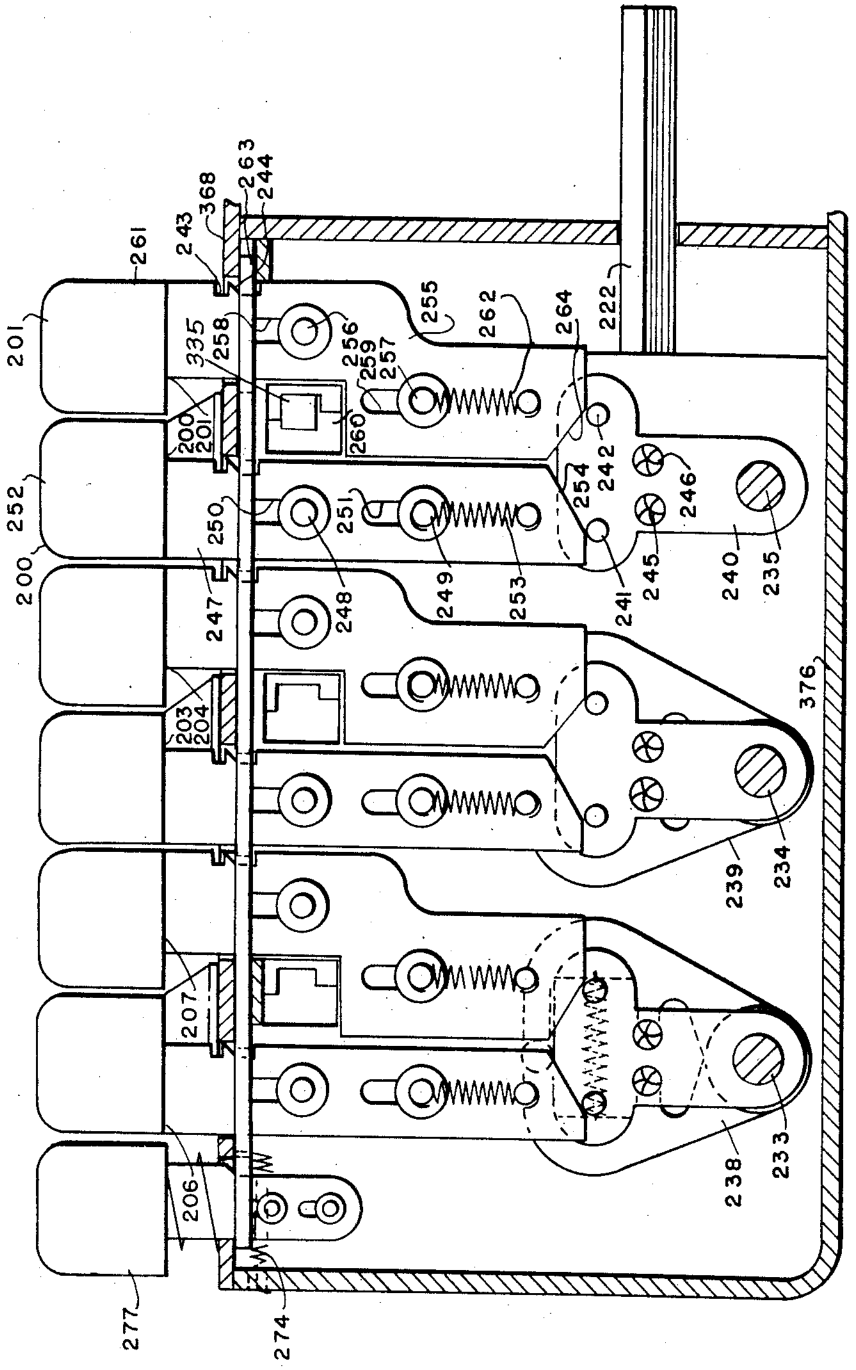
Fig. 20 is a cross-sectional view, taken from the right side, of the operation control keys of the three-register storage mechanism illustrated in Fig. 1, such as taken along the longitudinal plane indicated by the line 20—20 of Fig. 1.

Referring now to Fig. 20, the shafts 233, 234 and 235 are resiliently urged to the centered, or neutral, position by spring centering devices of well-known construction, as indicated at 238 and 239, for the shafts 233 and 234, respectively, and are moved to the addition and subtraction positions by the addition and subtraction keys of the corresponding registers. Taking the add and subtract keys 200 and 201 of the register 197, for example, an arm 240 is secured to the right-hand end of shaft 235 and extends upwardly therefrom, carrying near its upper end two spaced and outwardly projecting pins, or studs, 241 and 242. The arm 240 also carries, below the studs 241 and 242, spaced studs 245 and 246 with which the centering device, not illustrated for the shaft 235, cooperates to urge this shaft to its neutral position.

The addition key 200 has an elongated flat stem 247 mounted on the right-hand end wall of the unit frame for vertical movement by fixed studs 248 and 249 extending through slots 250 and 251 provided in the key stem at locations spaced longitudinally thereof. The stem 247 carries a key top 252 on its upper end and is urged to its upper limiting position by a tension spring 253. The stem 247 is provided on its bottom end with an inclined cam edge 254 which engages the stud 241 and, when key 200 is depressed, rocks the shaft 235 in a clockwise direction, as viewed in Fig. 20, and the corresponding add-subtract gate to its addition position.

The subtraction key 201 has a flat stem 255 mounted for vertical movement on the right-hand end wall of the unit frame by fixed studs 256 and 257 extending through slots 258 and 259, spaced longitudinally of the key stem. The upper portion of this key stem is offset in a direction away from the key stem 247 to provide, between the key stems, an opening 260 through which a portion of the register clearing mechanism, hereinafter described, extends. The key stem 255 carries a key top 261 on its upper end and is resiliently urged to its upper limiting position by a tension spring 262. The key stem 255 is provided on its bottom end with an inclined cam edge 264 which engages the stud 242 and rocks the shaft 235 in a counter-clockwise direction, as viewed in Fig. 20, and the add-subtract gate to its subtraction position.

As the addition and subtraction keys and mechanism for the registers 198 and 199 are identical in construction and operation to the keys and mechanism described above, a detailed description thereof is considered unnecessary for the purposes of the present disclosure.

Each of the addition and subtraction key stems 247 and 255 is provided, near the upper end of its rearward edge, with a notch 243 and with an upwardly and rearwardly inclined cam edge 244 immediately below the notch. A latching bar 263 is mounted for longitudinal movement under the top wall of the unit cover and is provided with openings through which the stems of the addition and subtraction keys extend. A spring 274 resiliently urges the bar in a forward direction to engage in the notch 243 in the stem of a depressed addition or subtraction key stem to hold the key in latched-down condition. A manual release key 277 is mounted in the machine cover at the forward end of the row of addition and subtraction keys and has an inclined cam edge bearing against the forward end of the bar 263 to force the bar rearwardly and release any depressed addition or subtraction key when the manual release key 277 is depressed.

With this arrangement, the supplementary registers and the nature of the entries therein can be pre-selected and will remain in the pre-selected condition until manually changed.

A register frame 265 is disposed immediately above the add-subtract gates 230, 231 and 232 (Fig. 21) and has a bottom wall 266, a vertical rear wall 267, a top wall 268 and intermediate vertical walls 269 and 270 dividing the interior of the frame into three register compartments 271, 272 and 273 of rectangular shape, the front side of the register frame being closed by the front wall 289 of the unit frame, or enclosure. The registers 199, 198 and 197, respectively, are disposed in the register compartments 271, 272 and 273, each register comprising a series of rotatable dial assemblies of the character illustrated in Figs. 8 to 14, inclusive, and described above.

A cam shaft 275 extends longitudinally of the unit 195 between the rear wall 267 of the register frame and the rear wall 224 of the unit frame. This shaft carries a series of plate cams 276 spirally set thereon, there being one cam 276 for each order of the registers 197, 198 and 199. A second cam shaft 278 extends longitudinally of the unit between the front register 199 and the front wall 289 of the unit, in parallel relationship to the camshaft 275. Thus cam shaft 278 also carries a series of spirally arranged plate cams 279 equal in number to the cams 276 and ordinally arranged with respect to the registers 197, 198 and 199.

Figure 17:
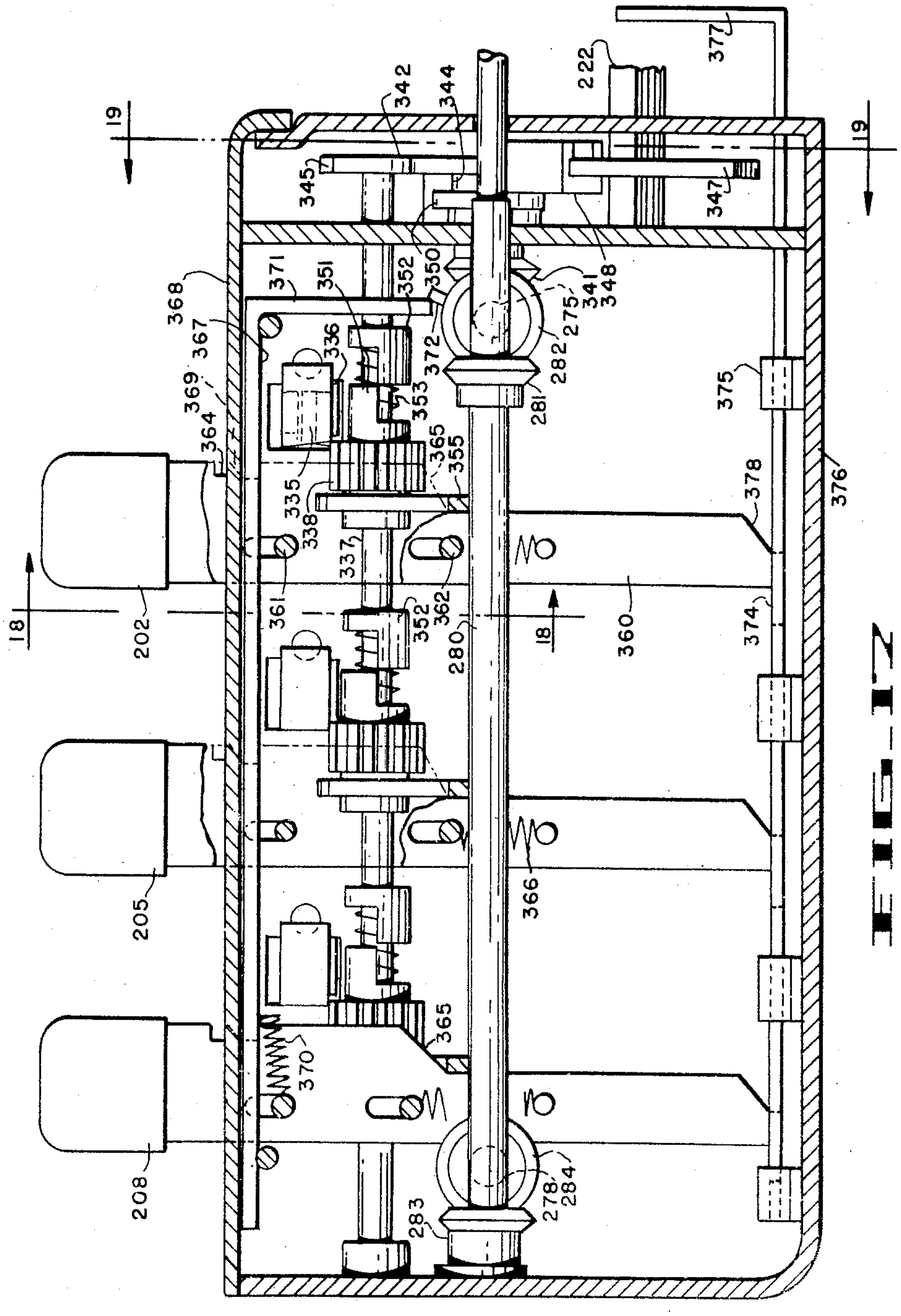
Fig. 17 is a cross-sectional view on an enlarged scale of the right side of the duplex register clearing controls of the embodiment of my invention illustrated in Fig. 1, taken along the vertical longitudinal plane indicated by the line 17—17 of Fig. 1.
Figure 13:
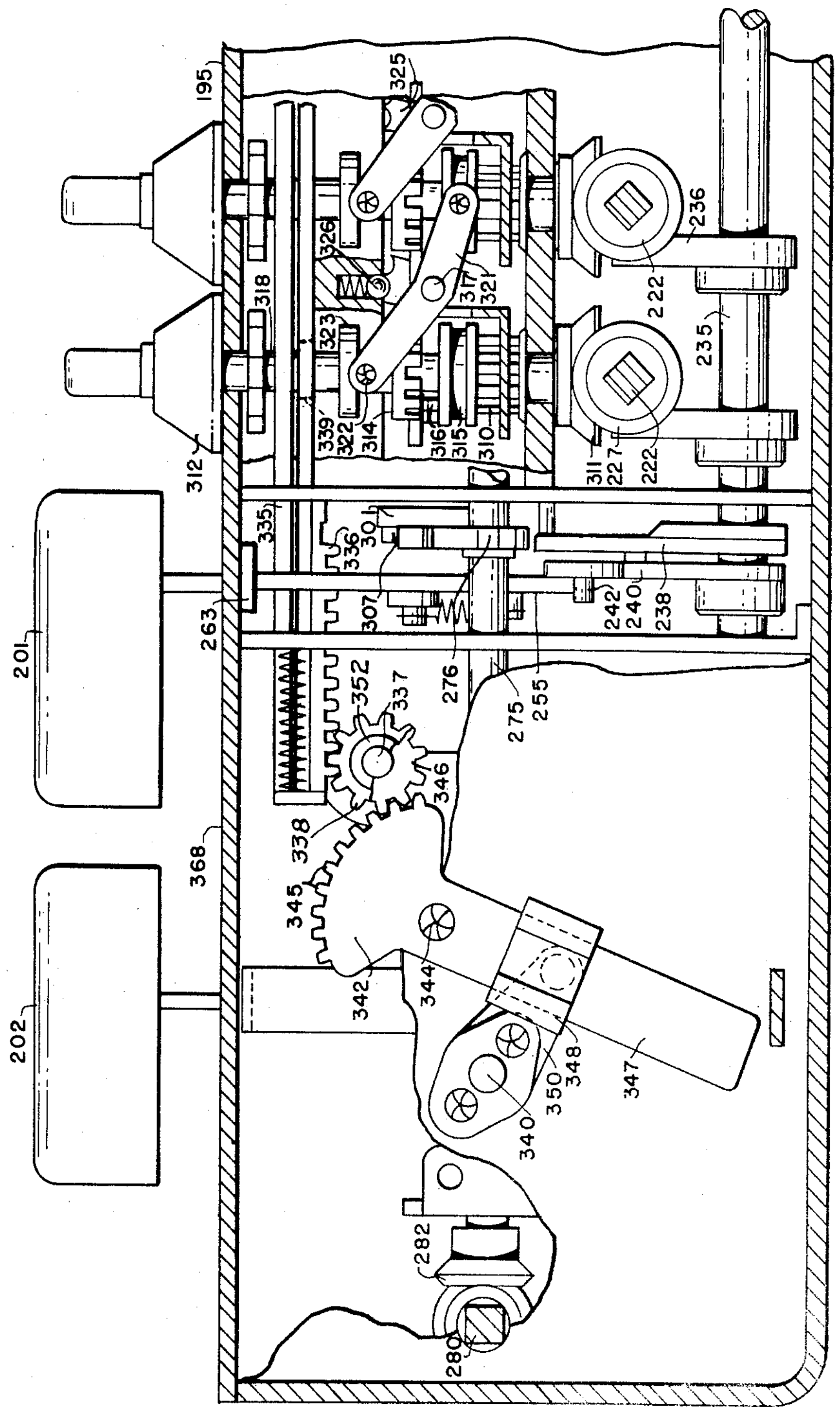

As shown in Fig. 17, a shaft 280 extends along the right-hand end of the unit 195 past the right-hand ends of the cam shafts 275 and 278 and is journalled in the unit frame with its rotational axis perpendicular to the rotational axes of the cam shafts. A bevel gear 281 on shaft 280 meshes with a bevel gear 282 on the right-hand end of cam shaft 275, and a bevel gear 383 on shaft 280 meshes with a bevel gear 284 on the right-hand end of cam shaft 278. All of these bevel gears are of the same size so that the cam shafts 275 and 278 are turned synchronously with each other and the shaft 280.

Figures 16, 18:
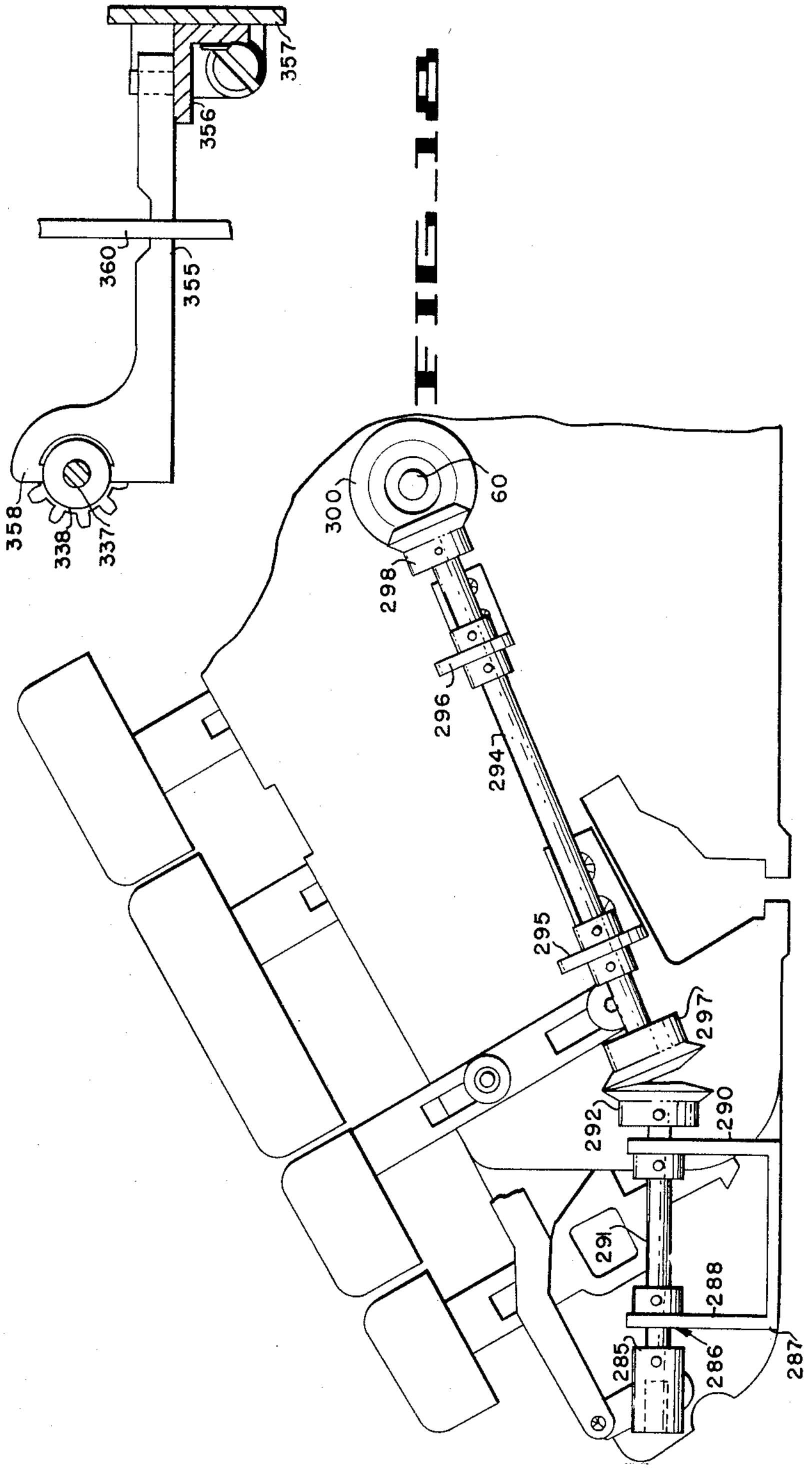
Fig. 16 is a fragmentary side elevational view of the right-hand side of the machine illustrated in Fig. 1 with the machine cover removed.
Fig. 18 is a fragmentary cross-sectional view taken along the transverse plane indicated by the line 18—18 of Fig. 17.

The shaft 280 projects through the rear side of the unit cover 196 and has its rear end received in the socket 285 of a coupling 286 shown in Fig. 16. The coupling 286 comprises a U-shaped bracket 287 mounted on the front end portion of the base of the calculating machine and having upstanding legs 288 and 290 and a shaft 291 journalled in the bracket legs above the machine base and carrying the socket 285 on its forward end and a bevel gear 292 on its rearward end.

A shaft 294 is journalled on the outside of the right-hand frame plate, or the control plate, of the calculating machine by spaced bearing brackets 295 and 296 mounted on the frame plate, and carries at its forward end a bevel gear 297 meshing with the coupling gear 292, and on its rearward end a bevel gear 298 meshing with a bevel gear 300 on the right-hand end of the main drive shaft 60 of the machine. The shaft 294 is driven synchronously with the main drive shaft 60 and the sets of beveled gears are so meshed that the cams 276 and 279 in any one order are in exact rotational phase with each other and with the coordinal cam 153 in the same order.

As shown in Fig. 21, a bar 301 extends past the three dial assemblies in each order of the three supplementary registers 197, 198 and 199 and is guided for vertical movements by fixed guide bars 302 and 303 extending through slots provided in ears 304 and 305 upstanding from the bar at locations spaced therealong. At its ends the bar 301 overlies the cams 276 and 279 of the same order and carries rollers 306 and 307 which ride on the edges of the corresponding cams 279 and 276. Intermediate its length the bar 301 has fingers engaged in the grooves 308 of the splined sleeves 310 of the dial assemblies of the corresponding order of the supplementary registers. The cams 279 and 276 are of a shape complementary to that of cams 153 in Fig. 4. That is, the lobes of cams 276 and 279 have an angular extension equal to that of the depression of cams 153, and the depressions of cams 276 and 279 angularly correspond to the lobes of cams 153. It will be recalled that the clutch rings 132 of the accumulator register are lifted into engagement with clutch plate 138 by the registration of cam followers, or sensing fingers, 160 with the low portion of the corresponding cams; while in the supplementary registers the clutch plates 315 are lifted into engagement with their respective clutch plates 314, by rollers 306 and 307 riding upon the lobes of cams 279 and 276. The cams 279 and 276, in the respective orders, are progressively staggered around their respective shafts by the same differential angles that separate the cams 153 on their respective shafts, so that each pair of cams 279 and 276 is in rotational phase with the cams 153 of corresponding orders, whereby the sleeves 310 in any order of the supplementary registers will be raised or lowered at the same time that the sleeve 127 in the same order of the main register is raised or lowered. Thus, the bevel drive gears 311 in any order of the supplementary registers will be drivingly connected to the corresponding dials 312 of the same order during the digitation interval, for that order and these driving connections will be interrupted as soon as the digitation interval terminates and before the tens-transfer interval begins. When the sleeves 310, which are the same in form and function as the splined sleeves 127 of register 36 (Figs. 8 to 13), are raised and lowered by the cams 276 and 279, the lugs, or teeth, on the upper ends of these sleeves are moved into, and out of, engagement with the grooves in the corresponding clutch elements 314 corresponding to the elements 138 (Figs. 8 and 9) in the same manner as in the main register dial assemblies described above.

The supplementary registers also have the same type of tens-transfer mechanism as described above in connection with the main registers, so that sums entered either additively or subtractively into the supplementary registers will be accurately totalized. The tens-transfer mechanism for each of the supplementary registers comprises an internally splined, externally grooved ring 315 corresponding in all respects to tens-transfer rings 132 (Figs. 8 to 13) of the accumulator register slidably mounted on each splined sleeve 310 and having upwardly projecting teeth 316 engageable in the grooves of the corresponding clutch element 314. Each register 197, 198 and 199 is provided with a series of ordinally arranged shafts 317 journalled respectively in the vertical walls forming the compartments 271, 272 and 273. The respective ordinal shafts are preferably axially aligned with each other, as shown in Fig. 21, but actually are three separate and functionally distinct shafts—one for each register—in each order. Preferably each shaft is journalled in the register frame 267 on the right-hand side of the dial assembly with which it is effective. As shown in Fig. 21, the shafts are so mounted that their axes extend transversely of the register and at right angles to the corresponding dial shaft 318. Each shaft 317 carries a rocker 321 rigidly mounted thereon, the lower arm of which extends downwardly and to the left (right in Figs. 19 and 22) immediately adjacent the tens-transfer ring 315 immediately to the left of the shaft. This arm is identical to arm 167 described in connection with the accumulator register 36 (Fig. 8), and carries at its distal end a clutch collar operating pin (not identified) engaged in the external groove in the clutch ring immediately to the left of the shaft. The arm 321 is extended upwardly and to the right and carries at its upper end, an abutment pin 322 cooperating with the lobe of a face cam 323 (identical to cams 142 of Figs. 8 to 10) on the dial shaft 318 immediately to the right of the corresponding tens-transfer shaft 317.

Thus, whenever a dial of any supplementary register is turned through its tens-transfer position, i.e., its "9" to "0" position, the tens-transfer clutch ring 315 of the next higher order is raised to engage its teeth in the grooves of the coordinal clutch element 314. Each shaft 317 carries near one end a latching dog 325 in the form of a perpendicularly projecting arm, having in its distal end a pair of spaced notches cooperating with an associated spring detent 326 to releasably latch the ring 315 in either its raised, operative, or its lowered, inoperative position.

Figure 22:
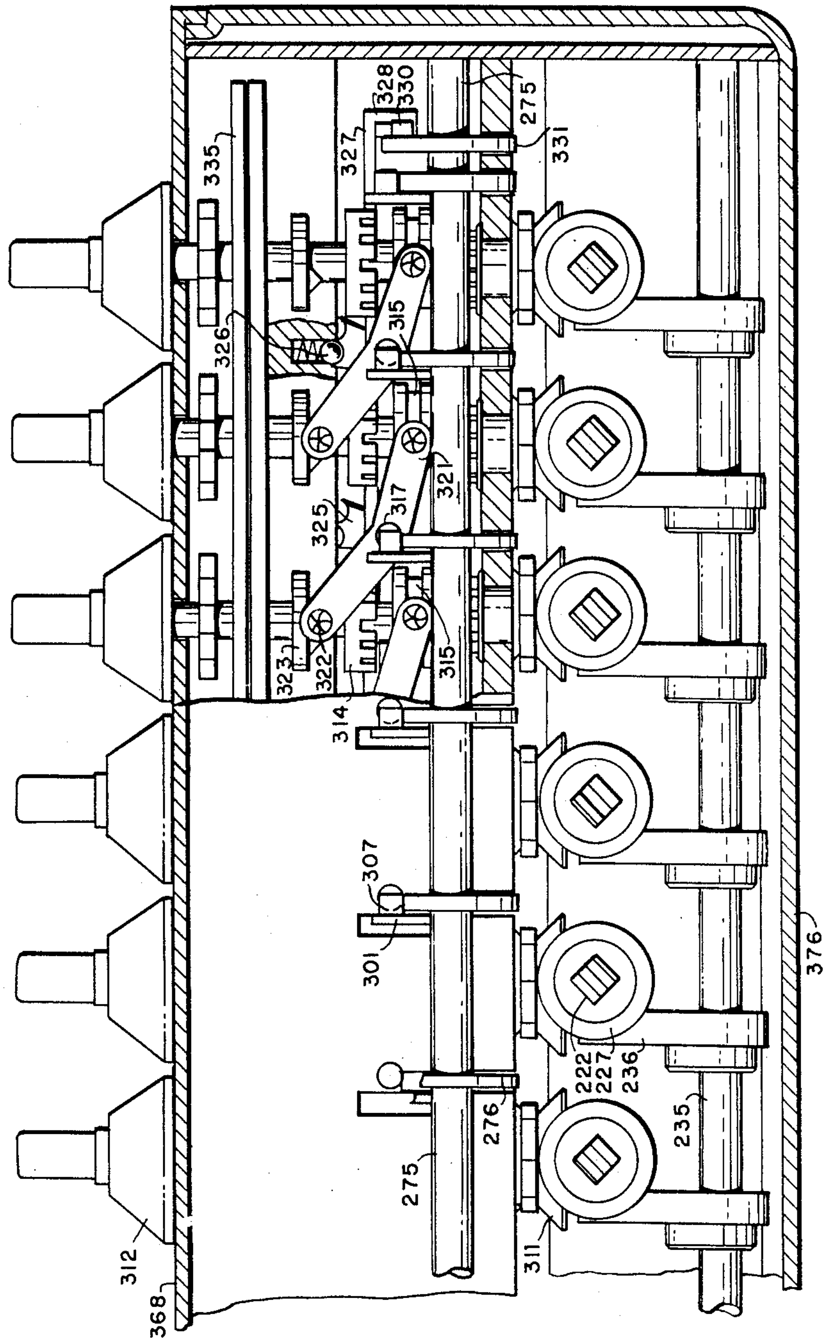

In order to restore the rings 315 to their lowered positions at the end of the cycle after the tens-transfers have been completed, a bar 327, shown in Fig. 22, extends along each supplementary register and is provided with notches spaced longitudinally thereof and individually receiving the intermediate portions of the latching arms 325 of the corresponding register. At its left-hand end (right end in Fig. 22) the bar 327 is provided with an abutment in the form of a sloping shoulder, or cam, formation 328 which cooperates with the lobe 330 of a face cam 331 on the adjacent cam shaft 275 to impart a longitudinal movement of sufficient extent and in the proper direction to the bar 327 to rock the latch arms 325 in a manner to restore the tens-transfer clutch rings 315 to their lowered, inoperative, position at the end of the coincident operating cycle of the machine. The tens-transfer clutch restore means for the front and rear registers may be operated respectively from the front and rear cam shafts 278 and 275, while the restore means for the intermediate register may be operated from a stub shaft geared to one of the cam shafts, or by interconnecting the restore means for the three registers.

With the above-described mechanism, the values entered into the main register of the machine can be entered either additively or subtractively into any selected one, or plurality, of the supplementary registers and the supplementary register, or registers, selected will make the necessary tens-transfers to show the proper totals. The addition and subtraction keys 200 and 201, when depressed, will remain in depressed position until manually restored, so that the supplementary registers will continue to function in the selected manner upon operation of the regular control keys of the machine, but in the form illustrated are not useful for multiplication or division since they do not shift relative to the keyboard of the machine. It will be apparent, however, to those skilled in the art, that the supplementary registers may be used with a back-transfer machine of known or novel construction to receive values back-transferred from the main register or the keyboard of the machine.

Suitable mechanism is provided for individually clearing the supplementary registers upon depression of the corresponding clear keys 202, 205 and 208, and includes a clearing rack 335 extending longitudinally of each supplementary register compartment and engaging the mutilated clearing, or zeroizing, gears 339 on the dial shafts 318, as shown in Fig. 21. Each clearing rack 335 has on the bottom surface of its right-hand end a rack 336 (Fig. 19). A shaft 337 extends forwardly through the unit frame and carries pinions 338 (Fig. 17) rotatably mounted thereon and respectively meshable with the racks 336 of the clearing racks 335. During each machine cycle an oscillatory movement is imparted to the shaft 337 in the following manner.

A stub shaft 340 extends through, and is journalled in, the rear wall of the unit housing between the drive shaft 280 and the clearing shaft 337. A bevel gear, not illustrated, on the rear cam shaft 275, meshes with a bevel gear 341 (Fig. 17) on the front end of the stub shaft to drive the stub shaft through one complete rotation each time the machine cycles. A sector gear 342 (Fig. 19) is disposed at the rear side of the rear wall of the unit housing and is pivotally mounted on a pivot pin 344 carried by the housing rear wall between the stub shaft 340 and the clearing shaft 337. The sector gear has teeth 345 meshing with the teeth of a spur gear 346 mounted on the rear end of the clearing shaft 337 and has a tail portion 347 of elongated rectangular shape, extending downwardly from the pivot pin 344. A slide 348 slidably receives the tail portion 347 of the sector gear and is pivotally connected to a crank arm 350 mounted on the rear end of the stub shaft 340 whereby rotation of the shaft and crank mounted thereon swings the sector gear 342 back and forth about the pivot pin 344 each time the machine cycles, thereby imparting an oscillatory rotational movement to the shaft 337.

Each of the pinions 338 (Fig. 17) has a hub 351 of semi-cylindrical shape, which is slidably, as well as rotatably, mounted on the shaft 337. Collars 352 are fixed on the shaft 337, one adjacent each of the pinions 338 and immediately to the rear thereof. Compression springs 353 surround the shaft 337, one between each pinion 338 and the associated collar 352, to resiliently urge the pinions out of engagement with the corresponding collars.

Arms 355, best shown in Fig. 18, are pivotally mounted at their right-hand ends on brackets 356 secured to the right-hand end wall 357 of the unit frame and extend from these brackets to the left toward the shaft 337. At their left-hand ends these brackets have fork formations 358 engaged in grooves in the hubs of the corresponding pinions 338, so that the pinions are shifted rearwardly and forwardly along the shaft 337 when the corresponding arms 355 are swung about their pivotal mountings on the brackets 356. The springs 353 resiliently shift the pinions forwardly until they are out of engagement with the corresponding collars 352 while remaining in alignment with the teeth of the gear racks 336. The arms 355, under actuation of the clear keys 202, 205 and 208 shift the pinions rearwardly until the pinion hubs 351 are brought into overlapping relationship with the collars 352 and the pinions thus drivingly connected to the shaft 337.

As is most clearly shown in Fig. 17, each of the clear keys 202, 205 and 208 for the supplementary registers, has an elongated flat key stem 360 disposed immediately forwardly of the intermediate portions of the arms 355 and mounted for vertical movement on the right-hand end frame plate of the unit by suitable means, such as the fixed studs 361 and 362 extending through corresponding slots provided in the key stem at locations spaced therealong. Each key stem 360 has, intermediate the length of its rearward edge, an upwardly and rearwardly inclined cam edge 365 which cooperates with a narrow intermediate portion of the corresponding lever arm 355.

Near its upper end, each clear key stem 360 is provided with a notch 364 and with an upwardly and rearwardly inclined cam edge 369 immediately below the notch. The clear keys are resiliently urged to their raised, or inoperative, position by suitable springs 366.

A latching bar 367 is mounted for longitudinal movement immediately below the top wall 368 of the unit cover 196 and is provided with openings through which the stems of the clear keys extend.

A spring 370 urges the latching bar in a forward direction so that it will enter the notch 364 in the stem of any depressed clear key and holds the key in latched-down condition. An abutment formation 371 is perpendicularly offset from the rearward end of the latch bar 367 and cooperates with a radial pin, or cam nose 372 on the cam shaft 275 to move the latch bar 367 rearwardly against the force of spring 370 at the end of a clearing cycle to release any depressed clearing key, or keys, as the machine is restored to full-cycle condition. A motor bar 374 extends along the bottom ends of the key stems 360 and is supported for longitudinal movement on brackets 375 upstanding from the bottom wall 376 of the unit cover. The key stems 360 are provided at their bottom ends with upwardly and rearwardly inclined cam edges 378 which engage corresponding shoulders on the bar 374 to force this bar rearwardly whenever any one of the clear keys is depressed. At its rearward end the bar 374 has an upstanding abutment formation 377 which engages the clutch and motor bar of the associated calculating machine to cycle the machine when an auxiliary register clear key is depressed. Thus, any selected one, or two, or all three, of the auxiliary, or supplementary, registers can be cleared when desired.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a cyclically operable calculating machine having a Thomas type actuating mechanism including dial driving shafts and stepped actuator drums effective to differentially drive said shafts, said drums operating through a value entering phase and transfer phase in each cycle of machine operation, add-subtract gear spools on said shafts, a register including a frame and dial assemblies ordinally mounted in said frame, the arrangement wherein each of said dial assemblies comprises a two part dial shaft with the two parts axially aligned, a numbered dial on one of said shaft parts at the outer side of said frame, a drive gear on the other of said shaft parts engageable by said add-subtract gear spool to drive the dial assembly, primary clutch means effective to interconnect said shaft parts to provide a driving connection between the drive gear and dial of the corresponding dial assembly, means operating in timed relationship to the operation of said actuator drums to connect said primary clutch means at the start of a value entering phase and disconnect said primary clutch means at the end of the value entering phase, secondary clutch means effective to interconnect the two parts of each dial shaft to provide a driving connection between the drive gear and the dial of the corresponding dial assembly, means responsive to the passage of the adjacent lower order dial assembly through the "9" to "0" position to engage the secondary clutch means, means resiliently latching said secondary clutch means in engagement, means disengaging all engaged secondary clutch means at the end of the transfer phase, and means imparting to each dial driving shaft an additional step of rotational movement during the coincident transfer phase.

2. A dial assembly for a calculating machine having a cyclically operative actuating means, a driving means therefor, and a register including an elongated frame and dial assemblies ordinally mounted in said frame, which comprises an axially aligned two part dial shaft journalled in said frame; a dial, a tens-transfer cam and a clutch element on one of said shaft parts; a dial drive gear, a primary clutch sleeve and a secondary clutch ring on the other of said shaft parts, said sleeve and said ring being driven by the associated shaft part; tens-transfer devices mounted in said frame and including shafts extending through said frame one adjacent each dial assembly with their rotational axes substantially perpendicular to the axes of said dial shafts, arms on each tens-transfer shaft engaging the adjacent secondary clutch ring to move the ring into engagement with the coordinal clutch element to provide a driving connection between the coordinal dial drive gear and dial, one of said arms having an extension engaged by the tens-transfer cam on the dial shaft of next lower order to rock said arms and move said secondary clutch ring into engagement with the coordinal clutch element when the dial on said dial shaft of next lower order turns through its "9" to "0" position, means carried by said frame detenting said secondary clutch ring in engaged position, and means carried by said frame and actuated by the driving means of the calculator for disengaging said secondary clutch rings; and means carried by said frame and actuated by said driving means for engaging said primary clutch sleeves with and disengaging them from said clutch element to make and break driving connections between said dial driving gears and the coordinal dials in phase with the actuating means.

3. In a cyclically operable calculating machine having a Thomas type actuator mechanism including actuator drums arranged for asynchronous actuation from the lowest to the highest order of the mechanism, each drum operating through a value entering interval and a tens-transfer interval in each operating cycle, and a carriage having a register comprising dial assemblies ordinally mounted in said carriage, each assembly including a dial shaft, a dial drive gear and a dial mounted for rotation relative to each other on said dial shaft, a digitation clutch and a tens-transfer clutch on each dial shaft effective to interconnect the coordinal dial drive gear and dial for synchronous rotation, means including ordinally arranged cams driven by said actuator mechanism synchronously with the actuator drums of the corresponding orders to individually enable said digitation clutches at the initiation of the value entering interval of the coincident operating cycle for the corresponding orders of actuator drums and to disable said clutches at the termination of such intervals, means operated by the passage of a dial through its tens-transfer position to enable the tens-transfer clutch of the adjacent higher order, means for imparting an additional increment of operation to the dial drive gear subsequent to termination of the value entering interval, and means for subsequently disabling said tens-transfer clutches.

4. In a calculating machine having a frame, a Thomas type actuator mechanism including actuator drums rotationally stepped from the lowest to the highest order of the mechanism and a carriage having a frame mounted for endwise movement on the machine frame, a register comprising dial assemblies ordinally mounted in said carriage frame and each including a dial shaft, a dial drive gear and a dial mounted for rotation relative to each other on said dial shaft, a digitation clutch on each dial shaft effective to interconnect the cordinal dial drive gear and dial for synchronous rotation, ordinally arranged cam means driven by said actuator mechanism in phase with the actuator drums of the corresponding orders, and levers ordinally mounted on said carriage frame in engagement with said digitation clutches and actuated by said cam means in phase with the corresponding orders of said actuator drums to individually disable said digitation clutches at the termination of the value entering intervals of the coincident operating cycle for the corresponding orders of actuator drums.

5. In a cyclically operative calculating machine having a single Thomas type actuator mechanism including ordinally arranged actuator drums rotationally stepped from the lowest to the highest order of the mechanism so that the value entry intervals of the operating cycle of the mechanism progress in wave form from the lowest to the highest order, the combination comprising a plurality of registers each including a plurality of ordinally arranged dial assemblies, each assembly comprising a dial shaft, a dial and a dial drive gear mounted on said shaft for rotation relative to each other, and a digitation clutch on said shaft for interconnecting the dial drive gear and dial for synchronous rotation; normally inoperative drive means for operatively connecting each actuator drum with the coordinal dial drive gears of the respective register; ordinally arranged means including cams driven by said actuator mechanism in rotational phase with the actuator drums to individually enable the coordinal digitation clutches in the respective registers at the beginning of an operating cycle of said actuator mechanism and successively disable the coordinal digitation clutches in the respective registers in rotational phase with the coordinal drums.

6. In a calculating machine having a Thomas type actuator mechanism including actuator drums rotationally stepped from the lowest to the highest order of the actuator mechanism, a register including a plurality of ordinally arranged dial assemblies, each assembly including a dial shaft, a dial and a dial drive gear mounted on said shaft for rotation relative to each other, means for operatively connecting said dial drive gears to their ordinally related actuator drums, a digitation clutch on each dial shaft for interconnecting the coordinal dial drive gear and dial for synchronous rotation, an ordinally arranged means including cams driven by said actuator mechanism in rotational phase with the actuator drums of the corresponding orders to individually enable said digitation clutches at the beginning of an operating cycle of said actuator mechanism and successively disable said digitation clutches at the termination of the value entering intervals for the corresponding orders of the actuator mechanism, a tens-transfer clutch on each dial shaft for interconnecting the corresponding dial driving gear and dial for synchronous rotation, tens-transfer setup means ordinally arranged between successive dial assemblies and each engaging a corresponding tens-transfer clutch and actuated by the dial assembly of next lower order when such lower order dial assembly passes through its tens-transfer position to enable the corresponding tens-transfer clutch and thereby set up a tens-transfer in the corresponding order of the register, means latching the enabled tens-transfer clutches in transfer setup condition until near the end of the coincident operating cycle of the actuator mechanism, means imparting to each dial drive gear a unit space rotational step after the value entering interval for the particular order has terminated to thereby complete any tens-transfers set up during the preceding value entering intervals, and means driven by said actuator mechanism and engaging said tens-transfer setup means to disable all enabled tens-transfer clutches at the end of the coincident operating cycle of said actuator mechanism.

7. In a cyclically operative calculating machine having a Thomas type actuator mechanism including actuator drums rotationally stepped from the lowest to the highest order of the mechanism so that the value entry intervals of the operating cycle of the mechanism progress in wave form from the lowest to the highest order, said actuator drums operating through a value entering interval and a tens-transfer interval in each cycle of operation, at least one register including a frame and dial assemblies ordinally mounted in the frame, each assembly including a dial shaft, a dial and a dial drive gear mounted on said shaft for rotation relative to each other, a digitation clutch on said shaft for interconnecting the corresponding dial drive gear and dial for synchronous rotation, an ordinally arranged means including cams driven by said actuator mechanism in rotational phase with the respective actuator drums to individually enable said digitation clutches at the beginning of a value entering interval of the coordinal actuator drum and individually disable the digitation clutches in each order at the termination of the value entering interval of the coordinal actuator drum, a tens-transfer clutch on each dial shaft for interconnecting the corresponding dial driving gear and dial for synchronous rotation, tens-transfer conditioning members ordinally arranged along said register frame, each of said conditioning members engaging a corresponding tens-transfer clutch and actuated by the dial assembly of next lower order when such lower order dial assembly passes through its tens-transfer position to enable the corresponding tens-transfer clutch for a tens-transfer in the corresponding order of the register, means latching the enabled tens-transfer clutches in transfer condition until near the end of the coincident operating cycle of the actuator mechanism, means for operatively connecting said dial drive gears to their ordinally related actuator drums, means imparting to each dial drive gear a unit space rotational step during the tens-transfer interval of the particular order to thereby complete any tens-transfers conditioned during the preceding value entering intervals, and means driven by said actuator mechanism and engaging said tens-transfer conditioning members to disable all enabled tens-transfer clutches at the end of the coincident operating cycle of said actuator mechanism.

8. In a cyclically operative calculating machine having a Thomas type actuator mechanism including actuator drums, said actuator drums operating through a value entering interval and a tens-transfer interval in each cycle of operation and said intervals being rotationally stepped from the lowest to the highest order of the actuator mechanism, a register including ordinally arranged dial assemblies, each assembly including a dial shaft, and a dial and a dial drive gear mounted on said shaft for rotation relative to each other, a digitation clutch on each dial shaft for interconnecting the coordinal dial drive gear and dial for synchronous rotation, an ordinally arranged means including cams driven by said actuator mechanism in rotational phase with the actuator drums of the corresponding orders to individually enable said digitation clutches at the beginning of a value entering interval of the coordinal actuator drum and individually disable said digitation clutches at the termination of such value entering interval, a tens-transfer clutch on each dial shaft for interconnecting the corresponding dial drive gear and dial for synchronous rotation, tens-transfer conditioning members ordinally arranged between said dial assemblies, each member engaging the tens-transfer clutch in the adjacent higher order and actuated by the dial assembly of adjacent lower order passing through its tens-transfer position to thereby enable the higher order tens-transfer clutch for a tens-transfer, means latching the enabled tens-transfer clutches in transfer condition until near the end of the coincident operating cycle of the actuator mechanism, means for operatively connecting said dial drive gears to their ordinally related actuator drums, means imparting to each dial drive gear a unit space rotational step during the tens-transfer interval for the particular order to thereby complete any tens-transfers conditioned during the preceding value entering intervals, and means driven by said actuator mechanism and engaging said tens-transfer conditioning members to disable all enabled tens-transfer clutches at the end of the coincident operating cycle of said actuator mechanism, said tens-transfers being completed in wave form closely following the wave form of said value entering intervals so that a tens-transfer in a lower order is completed before the value entering interval in the highest order has terminated.

9. In a cyclically operative calculating machine having a Thomas type actuator mechanism including actuator drums, said actuator drums operating through a value entering interval and a tens-transfer interval in each cycle of operation and the said intervals being rotationally stepped from the lowest to the highest order of the mechanism so that the value entry intervals and the tens-transfer intervals of the operating cycle of the mechanism progress in wave form from the lowest to the highest order, and registers including ordinally arranged dial assemblies, each assembly including a dial shaft, and a dial and a dial drive gear mounted on said shaft for rotation relative to each other, a digitation clutch for interconnecting the corresponding dial drive gear and dial for synchronous rotation, and ordinally arranged means including cams driven by said actuator mechanism in rotational phase with the respective actuator drums to individually enable said digitation clutches at the beginning of a value entering interval and disable them at the termination of the value entering interval for the corresponding orders of the actuator mechanism, a tens-transfer clutch in each dial assembly for interconnecting the corresponding dial drive gear and dial for synchronous rotation, tens-transfer conditioning means ordinally arranged between successive dial assemblies and each engaging the tens-transfer clutch of the adjacent higher order assembly and actuated by the dial of the adjacent lower order passing through its tens-transfer position to enable the corresponding tens-transfer clutch and determine a tens-transfer in the adjacent higher order, means latching the enabled tens-transfer clutches in transfer condition until near the end of the coincident operating cycle of the actuator mechanism, means for operatively connecting each actuator drum with the coordinal drive gears of the respective registers, means imparting to each dial drive gear a unit space rotational step during the tens-transfer interval for the particular order to thereby complete any tens-transfers determined during the preceding value entering interval, and means driven by said actuator mechanism for disabling said tens-transfer conditioning means at the end of the coincident operating cycle of said actuator mechanism, said tens-transfers being completed in each register in wave form closely following the wave form of the value entering intervals for the orders of the register so that a tens-transfer in a lower order of the register will be completed before the termination of the value entering interval in the higher order of the same register and a tens-transfer in the order will immediately follow the termination of the value entering interval in this order, thereby reducing the angular portion of an operating cycle required for value entering and tens-transfer.

10. In a cyclically operative calculating machine having a Thomas type actuator mechanism including actuator drums progressively effective from the lowest to the highest order of the actuator mechanism, said drums operating through a value entering interval and a transfer interval in each cycle of operation, a register including ordinally arranged dial assemblies, each assembly including a dial shaft, and a dial and a dial drive gear mounted on said shaft for free rotation relative to each other, a digitation clutch for interconnecting said dial drive gear and said dial for synchronous rotation, a transfer clutch for interconnecting said dial drive gear and said dial for synchronous rotation, means for operatively connecting said dial drive gears to their ordinally related actuator drums, means including ordinally arranged cams driven by said actuator mechanism in phase with the actuator drum of the corresponding orders for individually and successively enabling said digitation clutches at the beginning of the value entering interval and individually and successively disabling said digitation clutches at the termination of the value entering interval in the respective orders, an interorder transfer member between successive dial assemblies operative to engage the transfer clutch of the adjacent higher order dial assembly and each actuated by the dial assembly of the adjacent lower order passing through its interorder transfer position, means latching said transfer clutches in enabled condition, means driven by said actuator mechanism for disabling said transfer members at the end of an operating cycle of said actuator mechanism, and means effective during the transfer interval in each order to impart to the respective dial drive gears a further unit space rotational movement to complete an interorder transfer that may have been determined in the particular order during the preceding value entering interval.

11. In a calculating machine having a Thomas type actuator mechanism including actuator drums rotationally stepped from the lowest to the highest order of the actuator mechanism, a main register including a frame and dial assemblies ordinally mounted in said frame and each including a dial shaft, a dial and a dial drive gear mounted on said shaft for free rotation relative to each other, a digitation clutch for interconnecting said dial drive gear and said dial for synchronous rotation and a tens-transfer clutch for interconnecting said dial drive gear and said dial for synchronous rotation, means including ordinally arranged cams driven by said actuator mechanism in rotational phase with the actuator drums of the corresponding orders and engaging said digitation clutches to enable said clutches at the beginning of an operating cycle of said actuator mechanism and individually and successively disable said digitation clutches following the termination of the value entering intervals in the successive orders, tens-transfer setup means ordinally arranged along said frame and engaged one with the tens-transfer clutch of each dial assembly and each actuated by the dial assembly of the order next below the order of the tens-transfer clutch with which the particular tens-transfer setup means is engaged to enable the associated tens-transfer clutch when the dial assembly of the next lower order turns through ten unit spaces from its "0" position, means latching said tens-transfer clutches in enabled condition, means driven by said actuator mechanism and engaging said tens-transfer setup means to disable said tens-transfer clutches at the end of an operating cycle of said actuator mechanism, and means effective in each order of said actuator mechanism to impart to the coordinal dial driving gear a further unit space rotational movement to complete a tens-transfer that may have been set up in the particular order during the preceding value entering interval, at least one auxiliary register having a frame, and dial assemblies ordinally mounted in said frame and each comprising a dial shaft journalled in said frame, a dial and a dial drive gear mounted on said shaft for free rotation relative to each other, a digitation clutch for interconnecting said dial drive gear and said dial for simultaneous rotation and a tens-transfer clutch for interconnecting said dial driving gear and said dial independently of the coordinal digitation clutch, means driven by said actuator mechanism in phase therewith for driving the dial driving gears of the supplementary register, control keys for connecting said driving means to said dial driving gears for the additive or subtractive entry of values in the supplementary register, means including ordinally arranged cams driven by said actuator mechanism in ordinal phase therewith and connected to said digitation clutches to enable said clutches at the beginning of an operating cycle of actuator mechanism and individually and successively disable said clutches at the ends of the value entry intervals in the several orders, tens-transfer setup means ordinally mounted in the supplementary register frame one adjacent each supplementary register dial assembly and each actuated by a dial assembly of one order to enable the tens-transfer clutch of the next higher order, said means imparting one additional unit space rotational step to said main register dial driving gears also imparting such an additional rotational step to said supplementary register dial driving gears to complete the tens-transfers set up in said supplementary register by enabling of the tens-transfer clutches thereof, and means driven by said actuator mechanism and engaging the tens-transfer clutches of said auxiliary register to disable said tens-transfer clutches at the end of an operating cycle of said actuator mechanism.

12. In a calculating machine having a Thomas type actuator mechanism including actuator drums rotationally stepped from the lowest to the highest order of the actuator mechanism, a main register including a frame and dial assemblies ordinally mounted in said frame and each including a dial shaft, a dial and a dial drive gear mounted on said shaft for free rotation relative to each other, a digitation clutch on said dial shaft for interconnecting said dial drive gear and said dial for synchronous rotation and a tens-transfer clutch on said dial shaft for interconnecting said dial drive gear and said dial for synchronous rotation, means including ordinally arranged cams driven by said actuator mechanism in rotational phase with the actuator drums of the corresponding orders and engaging said digitation clutches to enable said clutches at the beginning of an operating cycle of said actuator mechanism and individually and successively disable said digitation clutches following the termination of the value entering intervals in the successive orders, tens-transfer setup means ordinally arranged along said frame and engaged one with the tens-transfer clutch of each dial assembly and each actuated by the dial assembly of the order next below the order of the tens-transfer clutch with which the particular tens-transfer setup means is engaged to enable the associated tens-transfer clutch when the dial assembly of the next lower order turns through ten unit spaces from its "0" position, means latching said tens-transfer clutches in enabled condition, means driven by said actuator mechanism and engaging said tens-transfer setup means to disable said tens-transfer clutches at the end of an operating cycle of said actuator mechanism, and means effective in each order of said actuator mechanism to impart to the coordinal dial driving gear a further unit space rotational movement to complete a tens-transfer that may have been set up in the particular order during the preceding value entering interval, at least one auxiliary register having a frame, and dial assemblies ordinally mounted in said frame and each comprising a dial shaft journalled in said frame, a dial and a dial drive gear mounted on said shaft for free rotation relative to each other, a digitation clutch on said shaft for interconnecting said dial drive gear and said dial for simultaneous rotation and a tens-transfer clutch carried by said shaft for interconnecting said dial driving gear and said dial independently of the coordinal digitation clutch, means driven by said actuator mechanism in phase therewith for driving the dial driving gears of the supplementary register, control keys for connecting said driving means to said dial driving gears for the additive or subtractive entry of values in the supplementary register, means including ordinally arranged cams driven by said actuator mechanism in ordinal phase therewith and connected to said digitation clutches to enable said clutches at the beginning of an operating cycle of said actuator mechanism and individually and successively disable said clutches at the ends of the value entry intervals in the several orders, tens-transfer setup means ordinally mounted in the supplementary register frame one adjacent each supplementary register dial assembly and each actuated by a dial assembly of one order to enable the tens-transfer clutch of the next higher order, said means imparting one additional unit space rotational step to said main register dial driving gears also imparting such an additional rotational step to said supplementary register dial driving gears to complete the tens-transfers set up in said supplementary register by enabling the tens-transfer clutches thereof, and means driven by said actuator mechanism and engaging the tens-transfer clutches of said auxiliary register to disable said tens-transfer clutches at the end of an operating cycle of said actuator mechanism, zeroizing means associated with said supplementary register, means including a clutch driven by said actuator mechanism and effective when said clutch is engaged and said actuator mechanism in operation to clear said supplementary register, a control key for engaging said clutch, and means operated by said clearing control key to establish an operating cycle of said actuator mechanism.

13. In a calculating machine having an actuator mechanism including relatively positionable actuator gears operating through a digitation phase and a tens-transfer phase in each cycle of operation and ordinally arranged gears adapted to be differentially driven by said actuator gears, and a register including a series of ordinally arranged dial assemblies, each assembly comprising a dial shaft, a dial and a dial drive gear driven by the ordinally related differentially driven gear, the dial and drive gear being mounted for rotation relative to each other on said dial shaft; a pair of digitation clutches on each dial shaft effective to interconnect the dial drive gear and dial for synchronous rotation, ordinally arranged cam means driven by said actuator mechanism in phase with the respective actuator gears, and means actuated by said cam means for engaging and disengaging the first of said digitation clutches in the digitation phase of the corresponding actuator gears, a tens-transfer cam on said dial shafts, a lever between each pair of shafts, said lever being rocked by the tens-transfer cam on the adjacent lower order shaft and when so rocked causing engagement of the second of said clutch means on the adjacent higher order shaft, and means driven by said actuator mechanism for imparting an extra increment of rotation to said differentially driven gears in the tens-transfer phase of the corresponding actuator gears.

14. In a calculating machine having a cyclically operative drive mechanism and a plurality of ordinally effective actuating means angularly staggered for actuation progressing across the orders of said machine, each actuating means operating through a digitation phase and a tens-transfer phase in each cycle of operation and having means for differentially actuating from one to nine increments during the digitation phase and means for actuating an additional increment during the tens-transfer phase, a register comprising a plurality of ordinally arranged dial assemblies, each assembly including a dial shaft, a dial on said shaft, a dial driving gear mounted on said shaft and driven by the ordinally related actuating means, a digitation clutch effective to drivingly connect said dial driving gear to said dial for the entry of values in said register, primary means actuated by said actuating means to individually engage each digitation clutch at the start of the respective digitation phase and disengage it at the end thereof, a tens-transfer clutch in each dial assembly, secondary means rendered effective by the passage of the dial assembly of the next lower order through its tens-transfer position to engage said tens-transfer clutch to connect the respective dial driving gear to its dial, and means operated by said drive mechanism for disabling said tens-transfer clutches at the end of an operating cycle of said driving means.

15. A dial assembly for an ordinally arranged calculating machine having a cyclically operative drive mechanism, a plurality of ordinally effective actuating means asynchronously arranged across the orders of said machine, each actuating means operating through a digitation phase and an interordinal-transfer phase in each cycle of operation and having means for differentiatally actuating said dial assemblies from one to nine increments during the digitation phase and means for actuating said assemblies an additional increment during the interordinal transfer phase, and a register containing a plurality of ordinally arranged dial assemblies, each assembly comprising a dial shaft, a dial on said shaft, and a dial driving gear mounted on said shaft and driven by said actuating means, a digitation clutch on each dial assembly effective to drivingly connect said dial driving gear to said dial for the entry of digital values determined by said actuating means into said register, means actuated by said actuating means to individually enable and disable said digitation clutches synchronously with the digitation phase of the respective actuating means, an interordinal-transfer clutch on each dial assembly, means rendered effective by the passage of the dial assembly of the next lower order through its interordinal-transfer position to enable the interordinal-transfer clutch and thereby drivingly connect the coordinal dial drive gear to the coordinal dial, and means operated by said drive mechanism for disabling said interordinal-transfer clutches at the end of an operating cycle of said driving means.

16. In a cyclically operative calculating machine having an ordinally arranged selection mechanism, an ordinally arranged Thomas-type actuator mechanism including actuator drums progressively effective from the lowest to the highest order of the actuator mechanism, said drums operating through a value entering interval in each cycle of operation, a register including a plurality of ordinally arranged dial assemblies, each assembly including a dial shaft, a dial and a dial drive gear mounted on said shaft for rotation relative to each other, means for driving said drive gear by their respective drums a number of increments determined by the coordinal selection mechanism, a digitation clutch on each dial assembly for interconnecting the coordinal dial drive gear and dial for synchronous rotation, and ordinally arranged means including cams driven by said actuator mechanism in phase with the actuator drums of the corresponding orders to individually and successively enable said digitation clutches at the beginning of the value entering interval of the corresponding actuator drum and successively disable said digitation clutches at the termination of such intervals for the corrseponding orders of the actuator mechanism.

17. In a cyclically operative calculating machine having a single Thomas-type actuator mechanism including ordinally arranged actuator drums rotationally stepped from the lowest to the highest order of the mechanism so that the value entry intervals of the operating cycle of the mechanism progress in wave form from the lowest to the highest order, said drums operating through a value entering phase and an interordinal-transfer phase in each cycle of operation, the combination comprising a plurality of registers each including a plurality of ordinally arranged dial assemblies, each assembly comprising a dial shaft, a dial and a dial drive gear mounted on said shaft for rotation relative to each other, and a digitation clutch on said shaft for interconnecting the corresponding dial drive gear and dial for synchronous rotation, an interordinal-transfer clutch on said shaft for interconnecting the dial drive gear and dial for synchronous rotation; normally inoperative drive coupling means for operatively connecting each actuator drum with the coordinal dial drive gears of the respective registers for additive or subtractive operation of the various dial drive gears; means for selectively operating the various drive coupling means additively or subtractively; ordinally arranged means including cams driven by said actuator mechanism in rotational phase with the actuator drums to individually enable the coordinal digitation clutches in the respective registers at the beginning of the value entering phase of the respective drum cycle and successively disable the coordinal digitation clutches in the respective registers at the termination of the value entering phase of the respective drum cycle; means operated by the adjacent lower order dial of the respective register passing through its interordinal-transfer position for operating the various interordinal-transfer clutches; and means associated with said drums for imparting to the coordinal dial clutches an additional increment of movement during the interordinal-transfer phase of its operation.

References Cited in the file of this patent

UNITED STATES PATENTS

| | | |
|---|---|---|
| 1,208,288 | Carlin | Dec. 12, 1916 |
| 1,641,615 | Berk | Sept. 6, 1927 |
| 2,360,704 | Moody | Oct. 17, 1944 |
| 2,586,420 | Ellerbeck | Feb. 19, 1952 |
| 2,660,377 | Chall | Nov. 24, 1953 |

UNITED STATES PATENT OFFICE

CERTIFICATION OF CORRECTION

Patent No. 2,950,051 August 23, 1960

Arthur J. Malavazos

It is hereby certified that error appears in the above numbered patent requiring correction and that the said Letters Patent should read as corrected below.

Column 4, line 68, for "detailed" read -- detail --; column 11, line 48, for "Thus" read -- This --; column 18, line 70, for "highest" read -- higher --; column 19, line 43, strike out "same"; line 44, after "the" insert -- highest --.

Signed and sealed this 6th day of June 1961.

(SEAL)
Attest:

ERNEST W. SWIDER
Attesting Officer

DAVID L. LADD
Commissioner of Patents